US012782841B2

(12) United States Patent
Akagi

(10) Patent No.: US 12,782,841 B2
(45) Date of Patent: Nov. 3, 2026

(54) LIGHT-EMITTING CHIP INCLUDING PLURALITY OF LIGHT-EMITTING PORTIONS, AND IMAGE-FORMING APPARATUS

(71) Applicant: CANON KABUSHIKI KAISHA, Tokyo (JP)

(72) Inventor: Daisuke Akagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/040,314

(22) Filed: Jan. 29, 2025

(65) Prior Publication Data

US 2025/0172887 A1 May 29, 2025

Related U.S. Application Data

(63) Continuation of application No. 18/351,721, filed on Jul. 13, 2023, now Pat. No. 12,242,208.

(30) Foreign Application Priority Data

Jul. 22, 2022 (JP) ................................ 2022-117429

(51) Int. Cl.

| | |
|---|---|
| ***G03G 15/00*** | (2006.01) |
| ***G03G 15/04*** | (2006.01) |
| ***G03G 15/043*** | (2006.01) |
| ***G06K 15/00*** | (2006.01) |
| ***G06K 15/02*** | (2006.01) |
| ***G06K 15/12*** | (2006.01) |

(52) U.S. Cl.

CPC ..... *G03G 15/043* (2013.01); *G03G 15/04054* (2013.01); *G06K 15/1228* (2013.01);

(Continued)

(58) Field of Classification Search

CPC .......... G03G 15/043; G03G 15/04054; G03G 15/04063; G03G 2215/0409;

(Continued)

(56) References Cited

U.S. PATENT DOCUMENTS

| | | | | |
|---|---|---|---|---|
| 5,502,478 A * | 3/1996 | Mimura | .................... | B41J 2/45 347/237 |
| 5,828,400 A * | 10/1998 | Fleming | .................... | B41J 2/45 347/237 |

(Continued)

OTHER PUBLICATIONS

European Search Report issued Oct. 17, 2023 in corresponding European Application No. 23186093.3 (Cited in Parent U.S. Appl. No. 18/351,721).

*Primary Examiner* — Robert B Beatty
(74) *Attorney, Agent, or Firm* — VENABLE LLP

(57) ABSTRACT

According to an aspect of the present invention, a light-emitting chip includes: a plurality of light-emitting portions and a drive circuit. The drive circuit includes: first to fourth transferring unit, a first switch configured to switch between a first state in which start signals output by the fourth and third transferring units are output to the second and first transferring unit, respectively, and a second state in which the start signal output by the fourth and the third transferring units are output to the third and second transferring unit, respectively, and a second switch configured to switch between a third state in which the first and third transferring units and the first signal line are connected, and a fourth state in which the first and third transferring units and a second signal line are connected.

6 Claims, 19 Drawing Sheets

(52) U.S. Cl.
CPC ..... *G06K 15/1247* (2013.01); *G06K 15/1261* (2013.01); *G06K 15/1898* (2013.01); *G03G 2215/0409* (2013.01)

(58) Field of Classification Search
CPC ....... G03G 2215/0412; G06K 15/1247; G06K 15/1261; G06K 15/1801; G06K 15/1898
USPC .......... 347/130, 132, 237, 238, 247; 399/51, 399/220
See application file for complete search history.

(56) References Cited

U.S. PATENT DOCUMENTS

| | | | | |
|---|---|---|---|---|
| 5,892,532 | A | 4/1999 | Katakura | |
| 6,853,396 | B1 * | 2/2005 | Omae | B41J 2/45 347/237 |
| 11,133,119 | B2 | 9/2021 | Akagi | |
| 2007/0058030 | A1 | 3/2007 | Nagumo | |
| 2009/0185025 | A1 * | 7/2009 | Toguchi | B41J 2/45 347/237 |
| 2010/0124438 | A1 * | 5/2010 | Nagumo | B41J 2/45 315/312 |
| 2015/0212447 | A1 | 7/2015 | Yagi | |
| 2015/0212448 | A1 * | 7/2015 | Kim | H05B 45/00 315/297 |
| 2020/0166863 | A1 * | 5/2020 | Noro | G03G 15/043 |
| 2021/0055669 | A1 * | 2/2021 | Yoshida | G03G 15/04081 |
| 2022/0146959 | A1 * | 5/2022 | Furuta | B41J 2/447 |
| 2023/0324826 | A1 * | 10/2023 | Akagi | G03G 15/04054 347/112 |
| 2024/0069461 | A1 | 2/2024 | Akagi | |

* cited by examiner

LIGHT-EMITTING CHIP INCLUDING PLURALITY OF LIGHT-EMITTING PORTIONS, AND IMAGE-FORMING APPARATUS

CROSS REFERENCE TO RELATED APPLICATIONS

This application is a continuation of U.S. application Ser. No. 18/351,721, filed on Jul. 13, 2023, the contents of which is incorporated by reference herein.

BACKGROUND OF THE INVENTION

Field of the Invention

The present invention relates to a light-emitting chip including a plurality of light-emitting portions, and an image-forming apparatus including the light-emitting chip.

Description of the Related Art

An electrophotographic image-forming apparatus forms an electrostatic latent image on a rotatingly-driven photosensitive member by exposing the photosensitive member, and forms an image by developing the electrostatic latent image with toner. Note that a direction that is parallel with the rotation axis of a photosensitive member will be referred to as a main scanning direction. US-2022-0146959 discloses an image-forming apparatus that performs exposure of one line in the main scanning direction using an exposure apparatus in which a plurality of light-emitting elements are arranged along the main scanning direction. US-2022-0146959 discloses an exposure apparatus including a circuit board that has mounted thereon light-emitting chips in which electrodes, an organic electro-luminescence (EL) film, and a circuit portion for causing the organic EL film to emit light are formed on a silicon wafer. A metal pad is formed on the silicon wafer, and the pad is connected via a wire (signal line) to a metal pad formed on the circuit board on which the silicon wafer is mounted. The circuit portion causes the organic EL film to emit light by applying voltages to the electrodes based on image data transmitted via the wire from a controller of the image-forming apparatus.

Here, the higher the image-forming speed of the image-forming apparatus, the greater the amount of image data that needs to be transmitted to the circuit portion per unit time. For example, as a method for increasing the amount of image data transmitted per unit time, a configuration of transmitting image data in parallel using two signal lines is conceivable. In this case, the circuit portion is configured so that each of a plurality of light-emitting elements is driven based on one of two parallely received pieces of image data.

Incidentally, in regard to light-emitting chips such as those described above, there are cases in which the same light-emitting chip is used as a light-emitting chip for an image-forming apparatus having a first image-forming speed and a light-emitting chip for an image-forming apparatus having a second image-forming speed that is lower than the first. In other words, there are cases in which it is desired to drive, based on image data received via one signal line, a light-emitting chip that includes a drive circuit that drives each light-emitting element based on image data received via one of two signal lines.

In such cases, because the plurality of light-emitting elements each drive based on image data transmitted via one of two signal lines, it may be impossible to drive all of the light-emitting elements if image data is transmitted via one signal line.

SUMMARY OF THE INVENTION

In view of the above-described problem, the present invention provides a light-emitting chip that allows image forming to be performed at different image-forming speeds.

According to an aspect of the present invention, a light-emitting chip mounted on a long circuit board includes: a plurality of light-emitting portions arranged along a longitudinal direction of the circuit board, the plurality of light-emitting portions emitting light for exposing a photosensitive member; a first electrical pad configured to receive image data for controlling the plurality of light-emitting portions on and off; a second electrical pad configured to receive the image data; and a drive circuit. The drive circuit includes: a plurality of image-data transferring units provided so as to correspond one-to-one with the plurality of light-emitting portions and each outputting, based on the image data, a drive signal for controlling drive of a corresponding one of the plurality of light-emitting portions, the plurality of image-data transferring units including: a first image-data transferring unit configured to output the drive signal to a first light-emitting portion; a second image-data transferring unit configured to output the drive signal to a second light-emitting portion that is adjacent to the first light-emitting portion on one side in the longitudinal direction of the circuit board; a third image-data transferring unit configured to output the drive signal to a third light-emitting portion that is adjacent to the second light-emitting portion on the one side in the longitudinal direction of the circuit board, and output, to one of the first and second image-data transferring units, a start signal that is an instruction to start outputting the drive signal; and a fourth image-data transferring unit configured to output the drive signal to a fourth light-emitting portion that is adjacent to the third light-emitting portion on the one side in the longitudinal direction of the circuit board, and output, to one of the second and third image-data transferring units, a start signal that is an instruction to start outputting the drive signal; a first signal line connected to the first and third image-data transferring units, the first signal line configured to transmit the image data received via the first electrical pad; a second signal line configured to transmit the image data received via the second electrical pad; a first switch circuit configured to switch between a first state in which the start signal output by the fourth image-data transferring unit is output to the second image-data transferring unit and the start signal output by the third image-data transferring unit is output to the first image-data transferring unit, and a second state in which the start signal output by the fourth image-data transferring unit is output to the third image-data transferring unit and the start signal output by the third image-data transferring unit is output to the second image-data transferring unit; and a second switch circuit configured to switch between a third state in which the first and third image-data transferring units and the first signal line are connected, and the first and third image-data transferring units and the second signal line are not connected, and a fourth state in which the first and third image-data transferring units and the second signal line are connected, and the first and third image-data transferring units and the first signal line are not connected.

Further features of the present invention will become apparent from the following description of exemplary embodiments with reference to the attached drawings.

DESCRIPTION OF THE EMBODIMENTS

Figure 1:
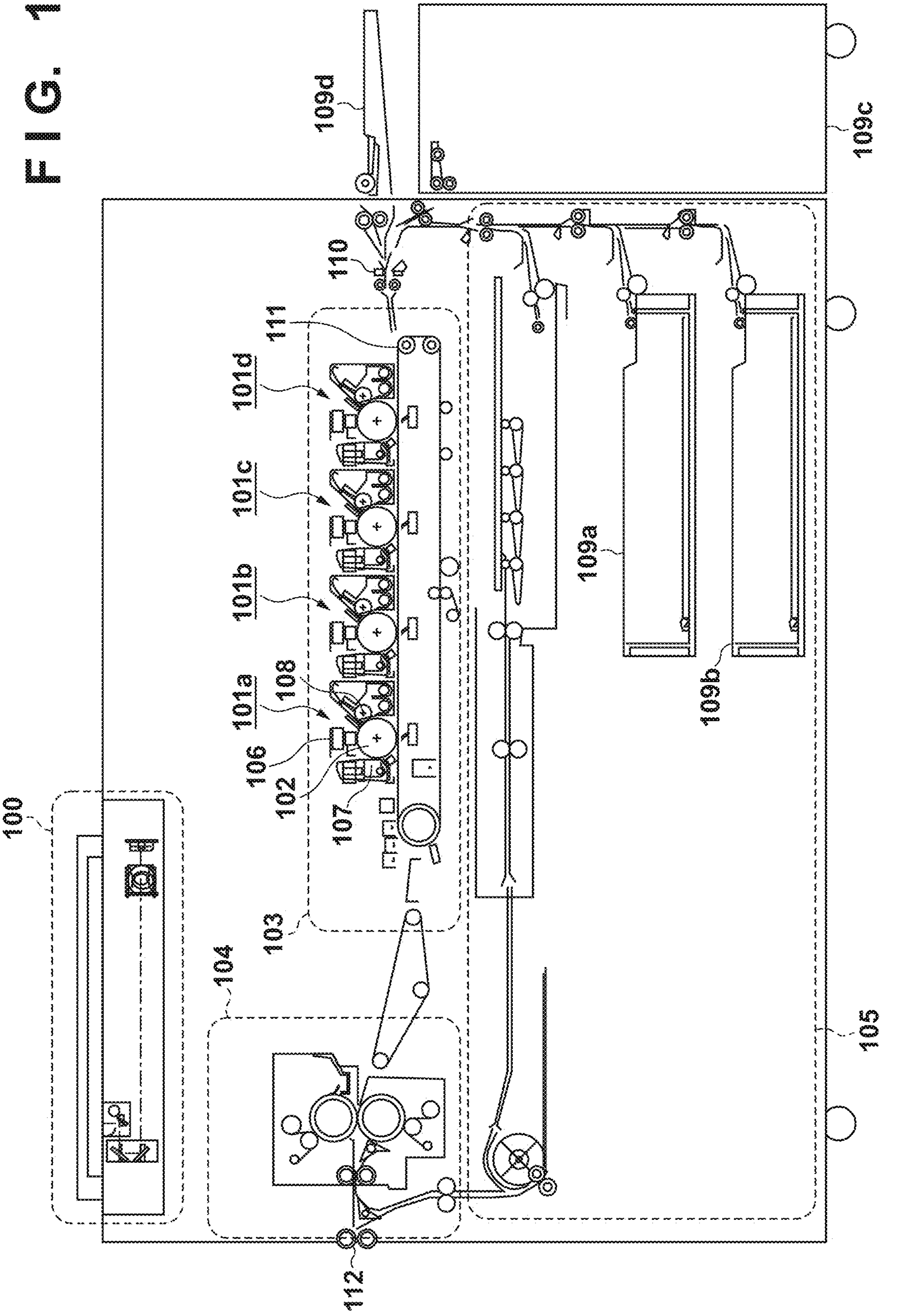
FIG. 1 is a schematic configuration diagram of an image-forming apparatus according some embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic configuration diagram of an image-forming apparatus according to the present embodiment. A reading unit 100 optically reads a document placed on a document table and generates image data indicating the result of the reading. An imaging unit 103 forms an image on a sheet based on image data generated by the reading unit 100 or image data received from an external device via a network, for example.

The imaging unit 103 includes image-forming units 101*a*, 101*b*, 101*c*, and 101*d*. The image-forming units 101*a*, 101*b*, 101*c*, and 101*d* respectively form black, yellow, magenta, and cyan toner images. The image-forming units 101*a*, 101*b*, 101*c*, and 101*d* have similar configurations, and are also collectively referred to as image forming units 101 in the following. A photosensitive member 102 of an image forming unit 101 is driven to rotate in the clockwise direction in the drawing during image forming. A charger 107 charges the photosensitive member 102. An exposure head 106, which is an exposure apparatus, exposes the photosensitive member 102 in accordance with image data, and forms an electrostatic latent image on the photosensitive member 102. A developer 108 develops the electrostatic latent image on the photosensitive member 102 with toner. The toner image on the photosensitive member 102 is transferred to a sheet conveyed on a transfer belt 111. Colors other than black, yellow, magenta, and cyan can be reproduced by transferring toner images on the respective photosensitive members 102 to a sheet so as to be overlaid on one another.

A conveyance unit 105 controls the feeding and conveyance of sheets. Specifically, the conveyance unit 105 feeds a sheet onto a conveyance path in the image-forming apparatus from a designated unit among internal storage units 109*a* and 109*b*, an external storage unit 109*c*, and a hand feeding unit 109*d*. The fed sheet is conveyed to registration rollers 110. The registration rollers 110 convey the sheet onto the transfer belt 111 at a predetermined timing so that toner images on the respective photosensitive members 102 are transferred to the sheet. As described above, the toner images are transferred to the sheet while the sheet is being conveyed on the transfer belt 111. A fixing unit 104 fixes the toner images onto the sheet by applying heat and pressure to the sheet having the toner images transferred thereon. After the toner images are fixed, the sheet is discharged to the outside of the image-forming apparatus by discharge rollers 112.

Figure 2A:
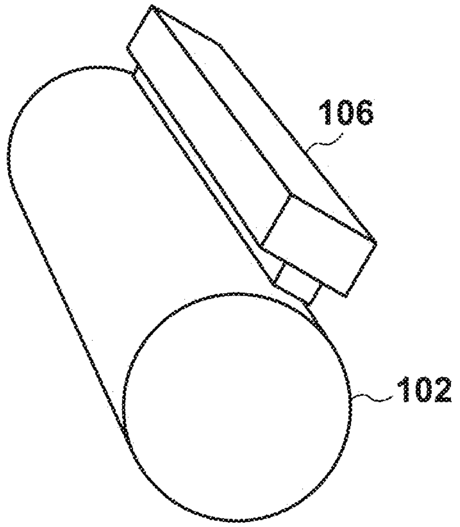
FIG. 2A and FIG. 2B are diagrams illustrating an exposure head and a photosensitive member according to some embodiments.
Figure 2B:
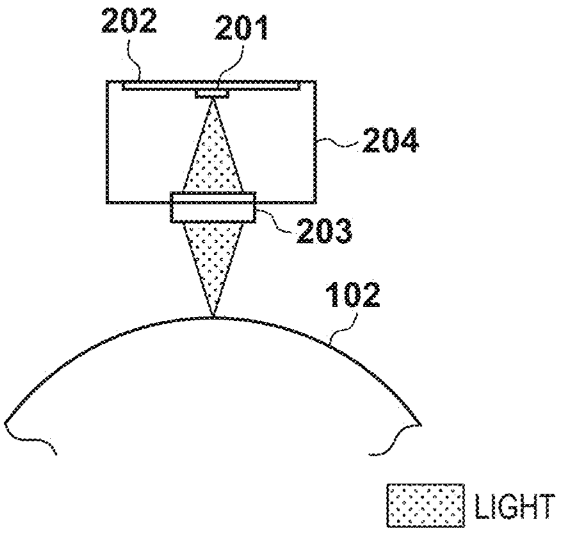

FIGS. 2A and 2B illustrate the photosensitive member 102 and the exposure head 106. The exposure head 106 includes a light-emitting-point group 201, a printed circuit board 202 on which the light-emitting-point group 201 is mounted, a rod lens array 203, and a housing 204 that holds the rod lens array 203 and the printed circuit board 202. The rod lens array 203 condenses light emitted from the light-emitting-point group 201 onto the photosensitive member 102, and forms imaging spots of a predetermined size on the photosensitive member 102.

Figure 3A:
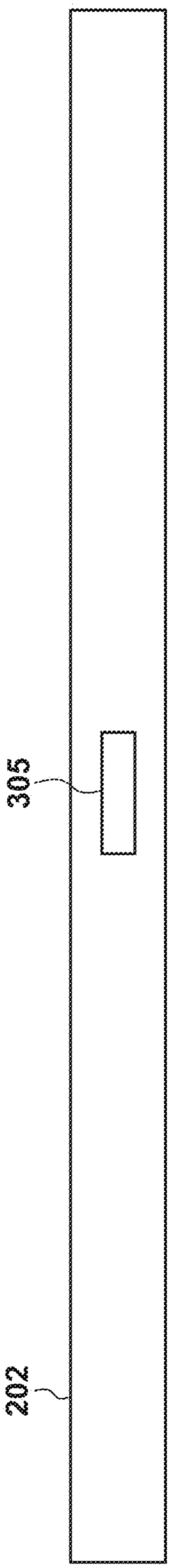
FIG. 3A and FIG. 3B are diagrams illustrating a printed circuit board of the exposure head according to some embodiments.
Figure 3B:
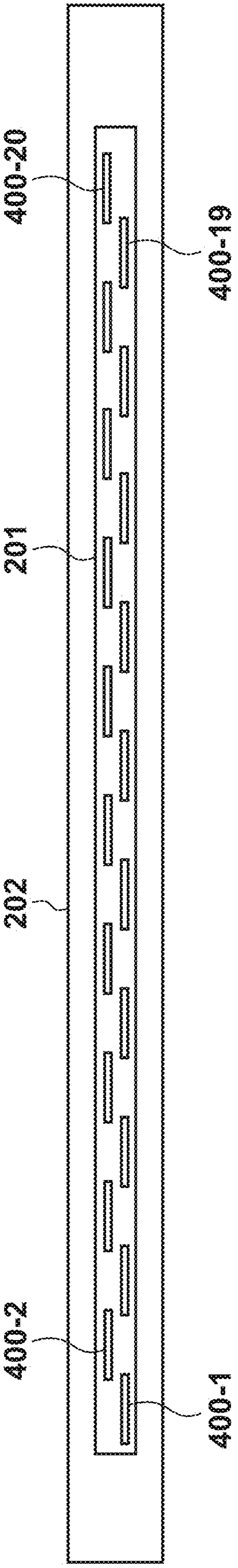

FIGS. 3A and 3B illustrate the printed circuit board 202. Note that FIG. 3A illustrates a surface on which a connector 305 is mounted, and FIG. 3B illustrates a surface on which the light-emitting-point group 201 is mounted (the opposite surface from the surface on which the connector 305 is mounted). In the present embodiment, the light-emitting-point group 201 includes twenty light-emitting chips, namely light-emitting chips 400-1 to 400-20. The light-emitting chips 400-1 to 400-20 are arranged in a staggered arrangement in two rows along the main scanning direction. In the following description, the light-emitting chips 400-1 to 400-20 are also collectively referred to as light-emitting chips 400. The light-emitting chips 400 may also be referred to as light-emitting units. Each light-emitting chip 400 includes a plurality of light-emitting points (light-emitting elements). Each light-emitting chip 400 on the printed circuit board 202 is connected to an image controller 700 (FIG. 7), which is a control unit, via the connector 305.

Figure 4:
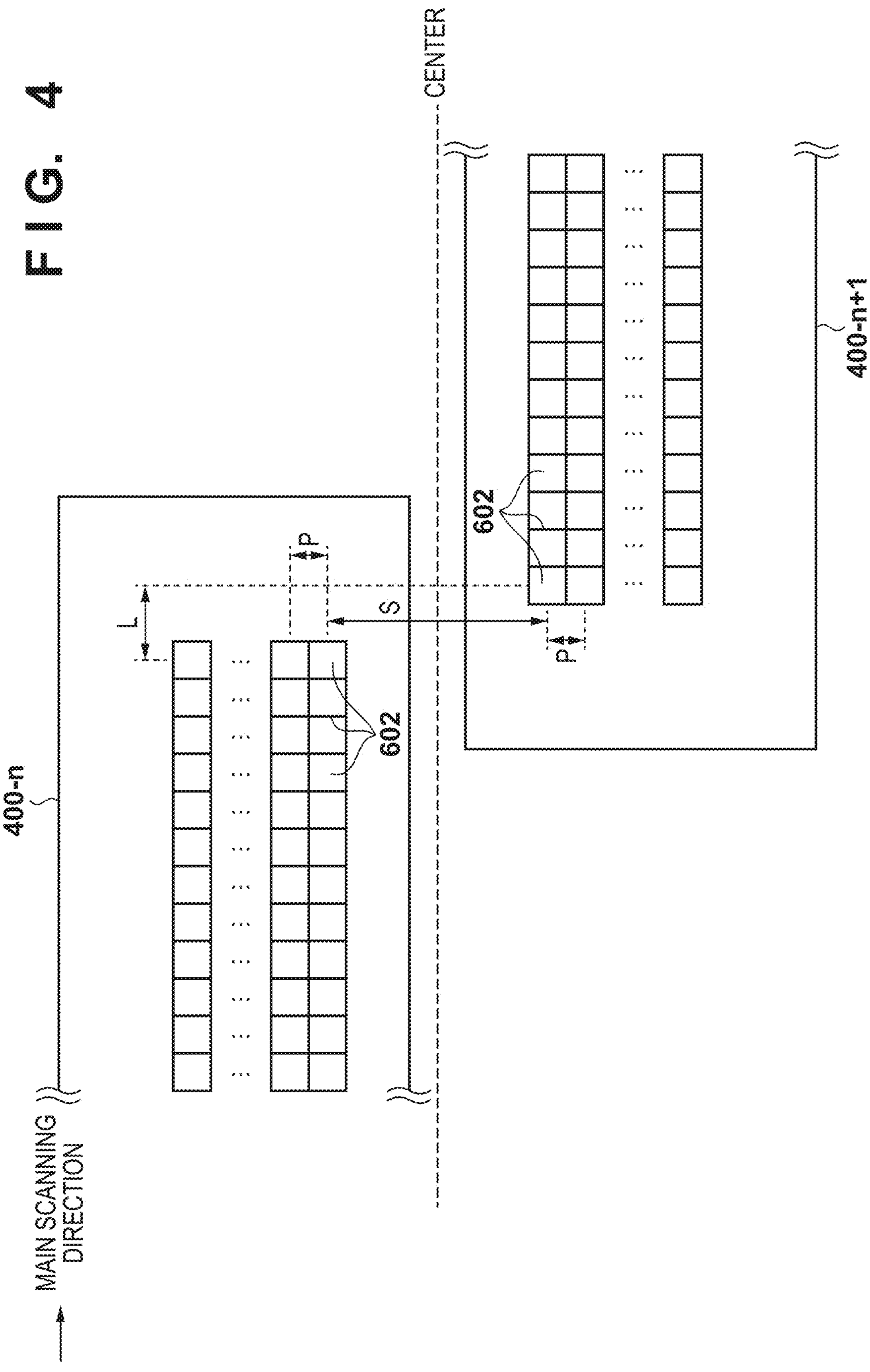
FIG. 4 is a diagram describing an arrangement of light-emitting elements in light-emitting chips according to some embodiments.

FIG. 4 illustrates light-emitting chips 400 and the arrangement of light-emitting points 602 provided in the light-emitting chips 400. Each light-emitting chip 400 includes a plurality of sets of 748 light-emitting points 602 arranged along the main scanning direction. Note that the plurality of sets are arranged along a sub-scanning direction that is orthogonal to the main scanning direction. Note that, in the following description, the number of sets is four, as one example. That is, in the following exemplary embodiments, the light-emitting chips 400 include four sets of 748 light-emitting points 602 arranged along the main scanning direction, i.e., a total of 2992 light-emitting points 602. The pitch between light-emitting points 602 adjacent in the main scanning direction is approximately 21.16 μm, which corresponds to a resolution of 1200 dpi. Accordingly, the length in the main scanning direction of the 748 light-emitting points 602 in one set is approximately 15.8 mm. In addition, the pitch (length P in FIG. 4) between light-emitting points 602 adjacent in the sub-scanning direction is also approximately 21.16 μm, which corresponds to a resolution of 1200 dpi. Furthermore, the pitch (length L in FIG. 4) between light-emitting points 602 of two light-emitting chips 400 adjacent in the main scanning direction is also approximately 21.16 μm, which corresponds to a resolution of 1200 dpi.

Figure 5:
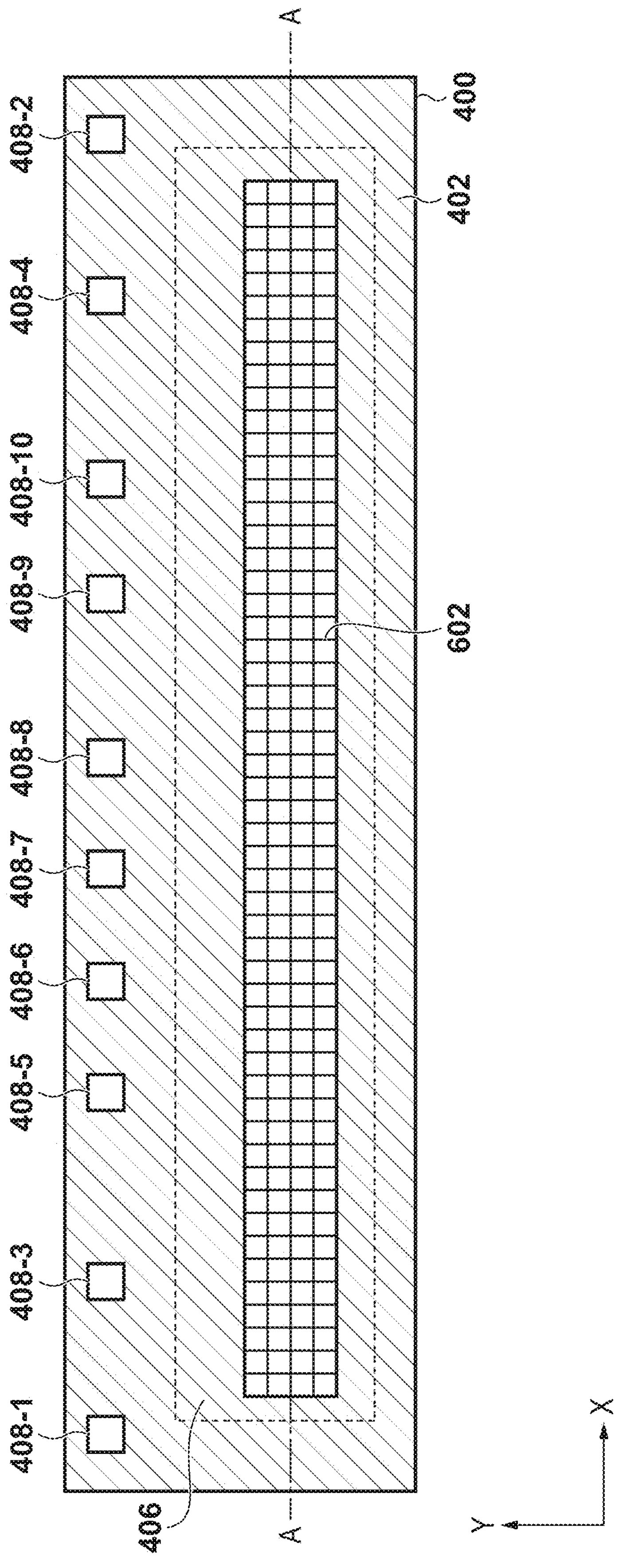
FIG. 5 is a plan view of the light-emitting chips according to some embodiments.

FIG. 5 is a plan view of a light-emitting chip 400. For example, the plurality of light-emitting points 602 in the light-emitting chip 400 are formed on a light-emitting substrate 402, which is a silicon substrate. Furthermore, a circuit portion 406 for controlling the plurality of light-emitting points 602 is provided in the light-emitting substrate 402. Signal lines for communication with the image controller 700, power lines for connection to a power source, and ground lines for connection to the ground are connected to electrical pads 408-1 to 408-10. For example, the signal lines, power lines, and ground lines are wires made from gold.

Figure 6:
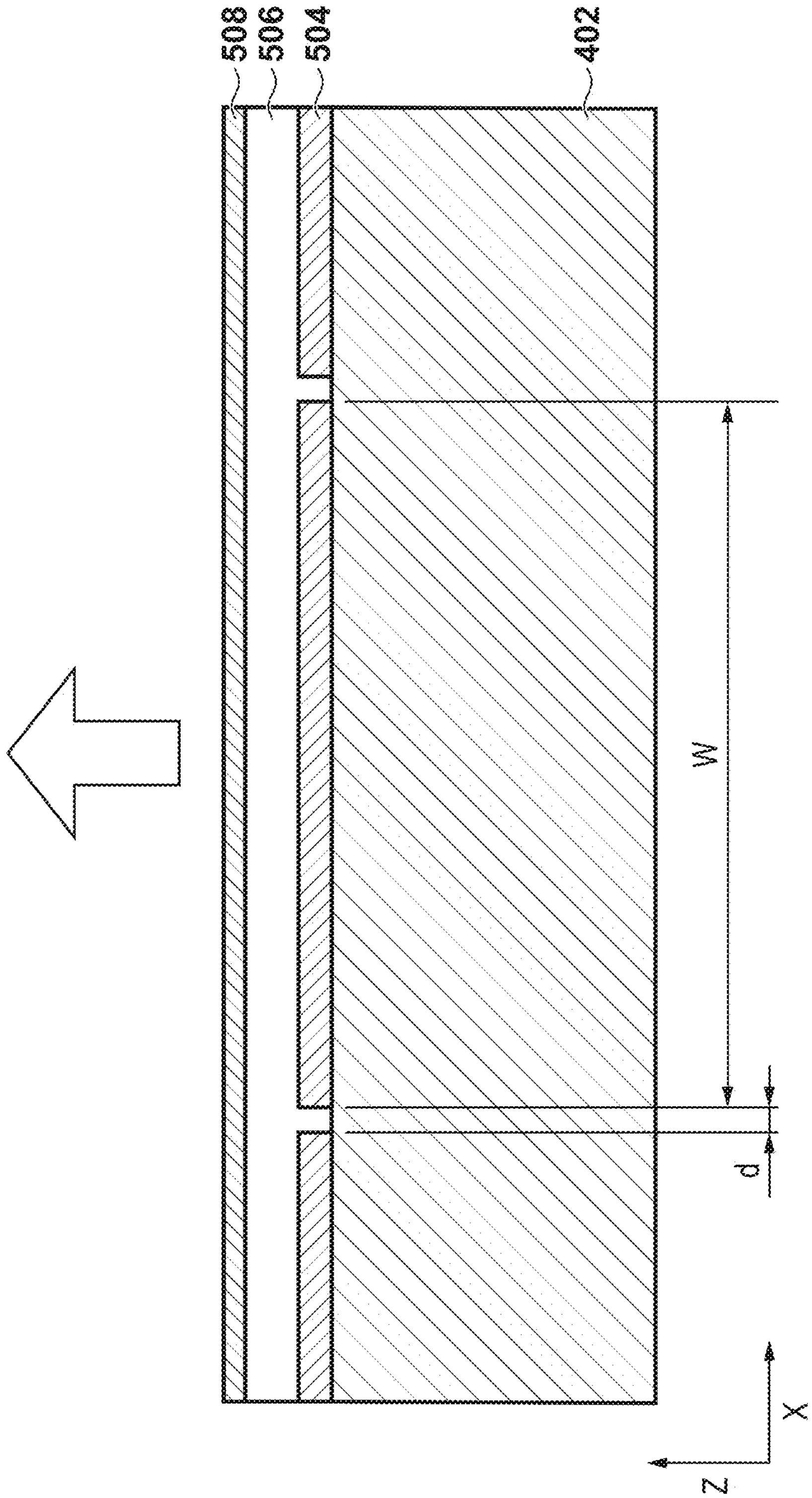
FIG. 6 is a cross-sectional view of the light-emitting chips according to some embodiments.

FIG. 6 illustrates a part of a cross-section taken along line A-A in FIG. 5. A plurality of lower electrodes 504 are formed on the light-emitting substrate 402. A gap having a length d is provided between two lower electrodes 504 that are adjacent to one another. A light-emitting layer 506 is provided on the lower electrodes 504, and an upper electrode 508 is provided on the light-emitting layer 506. The upper electrode 508 is a single common electrode shared by the plurality of lower electrodes 504. When a predetermined voltage is applied between a lower electrode 504 and the upper electrode 508, the light-emitting layer 506 emits light as a result of a current flowing from the lower electrode 504 to the upper electrode 508. Accordingly, a region of the light-emitting layer 506 corresponding to the region of one lower electrode 504 corresponds to one light-emitting point 602. That is, the light-emitting substrate 402 includes a plurality of light-emitting points in the present embodiment. Note that the light-emitting points may be referred to as light-emitting portions.

For example, an organic EL film may be used as the light-emitting layer 506. Alternatively, an inorganic EL film may be used as the light-emitting layer 506. For example, the upper electrode 508 is formed from a transparent electrode made from indium tin oxide (ITO) or the like so that the upper electrode 508 transmits the light-emission wavelengths of the light-emitting layer 506. Note that, while the entire upper electrode 508 transmits the light-emission wavelengths of the light-emitting layer 506 in the present embodiment, it is not necessary for the entire upper electrode 508 to transmit the light-emission wavelengths of the light-emitting layer 506. Specifically, it suffices as long as regions from which light from the light-emitting points 602 is to be emitted transmit the light-emission wavelengths.

Note that, while the light-emitting layer 506 is shared by all of the lower electrodes 504 provided in the light-emitting chip 400 in the present embodiment, this is not necessarily the case. For example, a configuration may be adopted in which first lower electrodes 504 among the plurality of lower electrodes 504 provided in the light-emitting chip 400 are covered by a first light-emitting layer 506, and second lower electrodes 504 among the plurality of lower electrodes 504 provided in the light-emitting chip 400 are covered by a second light-emitting layer 506. A region of a light-emitting layer 506 corresponding to the region of one lower electrode 504 corresponds to one light-emitting point 602 in such a configuration as well. Furthermore, a light-emitting layer 506 may be individually provided for each of the plurality of lower electrodes 504 provided in the light-emitting chip 400. A region of a light-emitting layer 506 corresponding to the region of one lower electrode 504 corresponds to one light-emitting point 602 in such a configuration as well.

Figure 7:
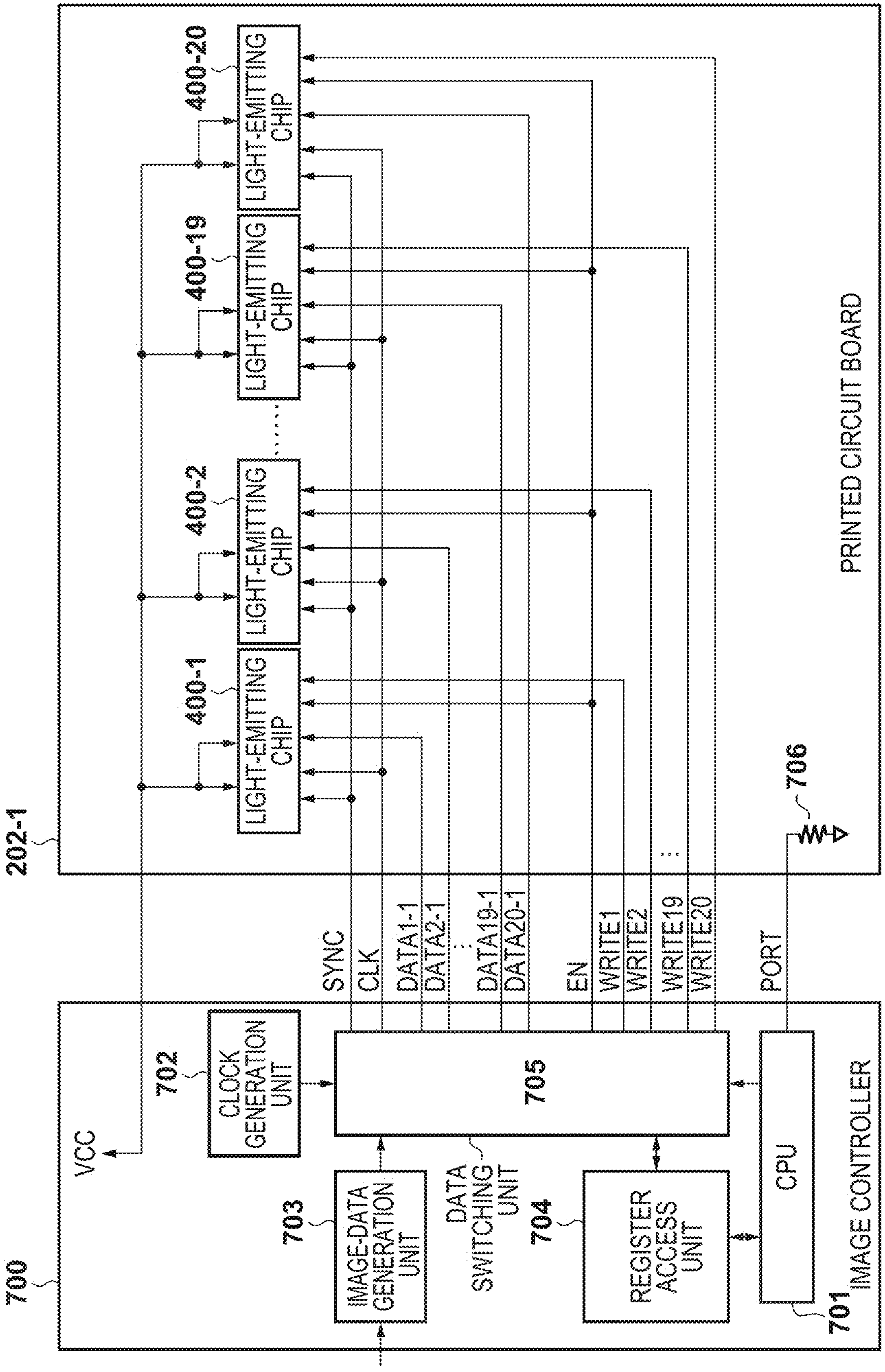
FIG. 7 is a configuration diagram of a first printed circuit board in which the light-emitting chips according to some embodiments are used.

FIG. 7 illustrates a printed circuit board 202-1 (first printed circuit board) on which the light-emitting chips 400-1 to 400-20 are provided. The printed circuit board 202-1 is used in a type of exposure head 106 that supports a slower image-forming speed compared to that supported by the type of exposure head 106 in which the later-described printed circuit board 202-2 (second printed circuit board) is used. In the following description, the printed circuit board 202-1 is a printed circuit board for an exposure head 106 of an image-forming apparatus having a 200-mm/s image-forming speed. Furthermore, the printed circuit board 202-2 is a printed circuit board for an exposure head 106 of an image-forming apparatus having a 400-mm/s image-forming speed. For example, the image-forming speed corresponds to the circumferential speed of the photosensitive member 102. Furthermore, in the following description, the sub-scanning-direction resolution is 1200 dpi (approximately 21.16 μm).

A data switching unit 705 and each light-emitting chip 400 are connected via a plurality of signal lines (wires). Specifically, the data switching unit 705 and a light-emitting chip 400-*n* (n being an integer of 1 to 20) are connected via a signal line DATAn-1 and a signal line WRITEn. The signal line DATAn-1 is used by the data switching unit 705 to transmit image data to the light-emitting chip 400-*n*. The signal line WRITEn is used by the data switching unit 705 to write control data to a register of the light-emitting chip 400-*n*. The signal line WRITEn may also be referred to as a control line because control data is transmitted via the signal line WRITEn.

Furthermore, the data switching unit 705 and all light-emitting chips 400 are connected via one signal line CLK, one signal line SYNC, and one signal line EN. The signal line CLK is used to transmit a clock signal during the transmission of data via the signal lines DATAn-1 and WRITEn. The data switching unit 705 outputs, to the signal line CLK, a clock signal generated based on a reference clock signal from a clock generation unit 702. The signals transmitted to the signal line SYNC and the signal line EN will be described later.

A CPU 701 controls the entire image-forming apparatus. An image-data generation unit 703 generates image data for controlling the on/off of light-emission of the light-emitting points 602 of each light-emitting chip 400 by performing various types of image processing such as half-toning processing on image data received from the reading unit 100 or an external device. The image-data generation unit 703 transmits the generated image data to the data switching unit 705. A register access unit 704 receives, from the CPU 701, control data to be written to the register in each light-emitting chip 400, and transmits the control data to the data switching unit 705. Note that, as illustrated in FIG. 7, the printed circuit board 202-1 is provided with a pull-down resistor 706. One end of the pull-down resistor 706 is connected to the CPU 701 via a control line PORT. The other end of the pull-down resistor 706 is connected to a predetermined potential, which is the ground potential in the present example. Based on the potential of the control line PORT, the CPU 701 can determine that the exposure head 106 mounted in the image-forming apparatus is that of a first type including the printed circuit board 202-1.

Figure 8:
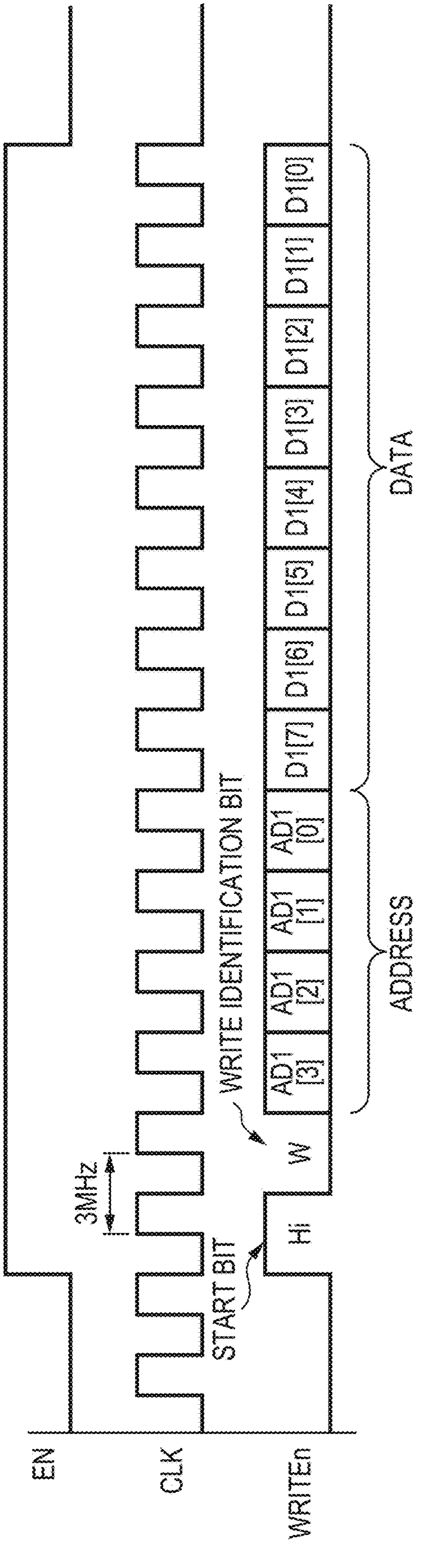
FIG. 8 is a diagram illustrating examples of signals of signal lines for accessing a register of the light-emitting chips according to some embodiments.

FIG. 8 illustrates signals of signal lines in a case in which control data is written to the register of a light-emitting chip 400. An enable signal that switches to high level during communication to indicate that communication is in progress is output to the signal line EN. In synchronization with the rise of the enable signal, the data switching unit 705 transmits a start bit to the signal line WRITEn. Subsequently, the data switching unit 705 transmits a WRITE identification bit indicating a write operation, and then transmits the address (4 bits in the present example) of the register to which control data is to be written, and the control data (8 bits in the present example). Upon performing writing to the register, the data switching unit 705 sets the frequency of the clock signal transmitted to the signal line CLK to 3 MHz, for example.

Figure 9:
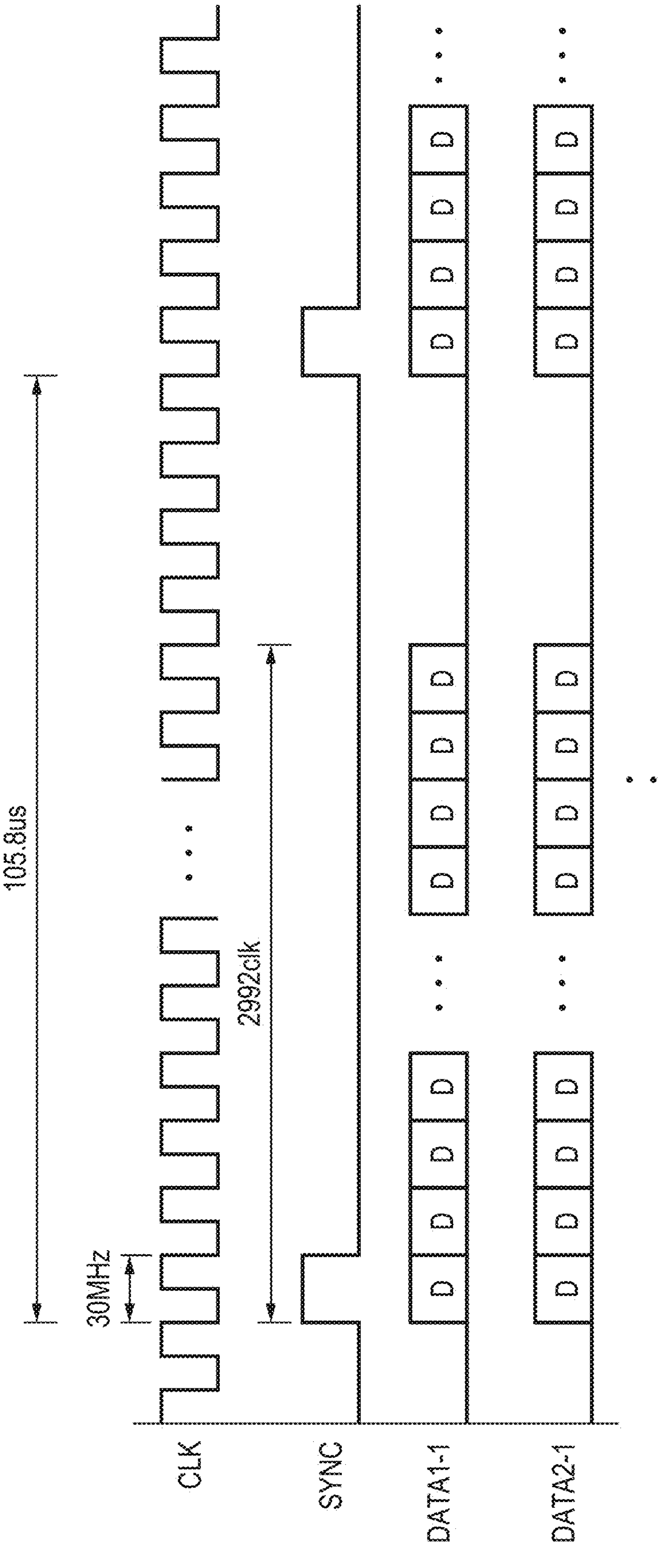
FIG. 9 is a diagram illustrating examples of signals of signal lines for transmitting image data to the light-emitting chips on the first printed circuit board according to some embodiments.

FIG. 9 illustrates signals of signal lines in a case in which image data is transmitted to each light-emitting chip 400 on the printed circuit board 202-1. A line synchronization signal indicating an exposure timing of one line of the photosensitive member 102 is output to the signal line SYNC. The line synchronization signal is output at intervals of approximately 105.8 μs because the image-forming speed of the printed circuit board 202-1 is 200 mm/s, and the sub-scanning-direction resolution of the printed circuit board 202-1 is 1200 dpi (approximately 21.16 μm). The data switching unit 705 transmits image data to the signal line DATAn-1 in synchronization with the rise of the line synchronization signal. In the present embodiment, because each light-emitting chip 400 includes 2992 light-emitting points 602, image data indicating whether or not light is to be emitted by each of the total of 2992 light-emitting points 602 needs to be transmitted within a period of approximately 105.8 μs. In order to transmit image data corresponding to the total of 2992 light-emitting points 602 within the period of approximately 105.8 μs, in the present example, the data switching unit 705 sets the frequency of the clock signal transmitted to the signal line CLK to 30 MHz upon transmitting image data, as illustrated in FIG. 9.

Figure 10:
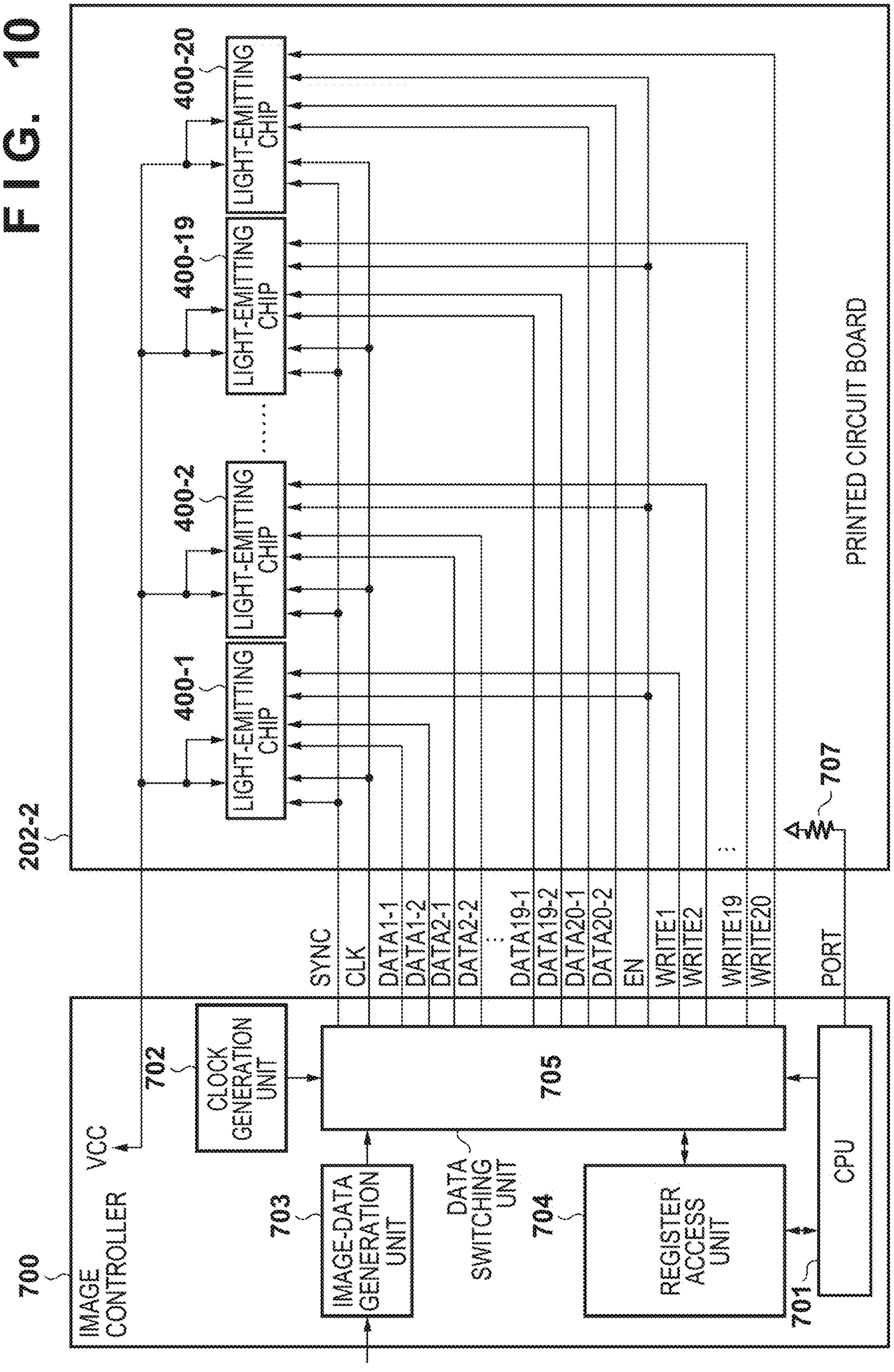
FIG. 10 is a configuration diagram of a second printed circuit board in which the light-emitting chips according to some embodiments are used.

FIG. 10 illustrates a printed circuit board 202-2 (second printed circuit board) on which the light-emitting chips 400-1 to 400-20 are provided. As mentioned above, the image-forming speed of the printed circuit board 202-2 is 400 mm/s. Note that the light-emitting chips 400 are the same as those used for the printed circuit board 202-1. In the following, the differences from the printed circuit board 202-1 illustrated in FIG. 7 will be described. Each light-emitting chip 400 on the printed circuit board 202-2 receives image data via both signal lines DATAn-1 and DATAn-2. Thus, the data switching unit 705 and a light-emitting chip 400-*n* are also connected via the signal line DATAn-2. Furthermore, as illustrated in FIG. 10, the printed circuit board 202-2 is provided with a pull-up resistor 707 in place of the pull-down resistor 706 of the printed circuit board 202-1. One end of the pull-up resistor 707 is connected to the CPU 701 via the control line PORT. The other end of the pull-up resistor 707 is connected to a predetermined potential that is different from the ground potential. Based on the potential of the control line PORT, the CPU 701 can determine that the exposure head 106 mounted in the image-forming apparatus is that of a second type including the printed circuit board 202-2.

Figure 11:
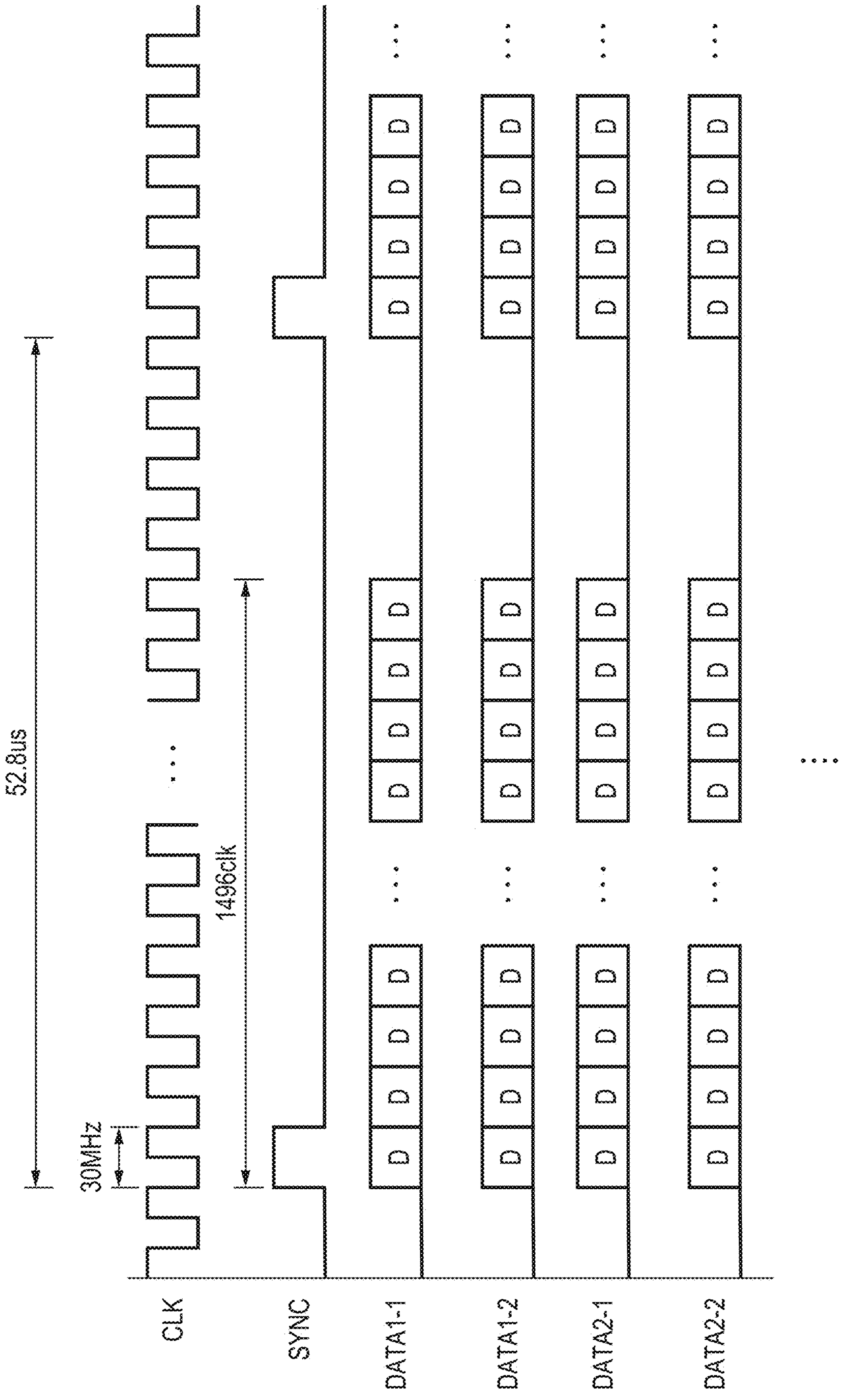
FIG. 11 is a diagram illustrating examples of signals of signal lines for transmitting image data to the light-emitting chips on the second printed circuit board according to some embodiments.

FIG. 11 illustrates signals of signal lines in a case in which image data is transmitted to each light-emitting chip 400 on the printed circuit board 202-2. A line synchronization signal indicating an exposure timing of one line of the photosensitive member 102 is output to the signal line SYNC. The line synchronization signal is output at intervals of approximately 52.8 μs because the image-forming speed of the printed circuit board 202-2 is 400 mm/s, and the sub-scanning-direction resolution of the printed circuit board 202-2 is 1200 dpi (approximately 21.16 μm). The data switching unit 705 transmits image data to the signal lines DATAn-1 and DATAn-2 in synchronization with the rise of the line synchronization signal. If image data is to be transmitted via one signal line DATAn-1 as is the case with the printed circuit board 202-1, the data switching unit 705 needs to set the frequency of the clock signal transmitted to the signal line CLK to 60 MHz in order to achieve the 400-mm/s image-forming speed. In the present embodiment, because image data is transmitted via two signal lines, the amount of image data that can be transmitted per unit time can be doubled while keeping the frequency of the clock signal at 30 MHz, which is the same as that in the case of the printed circuit board 202-1. Due to this configuration, the amount of image data that the light-emitting chips 400 can receive per unit time can be doubled without excessively increasing the frequency of the clock signal, or in other words, the transmission speed of image data. Note that the processing for accessing the register is similar to that of the printed circuit board 202-1, which is illustrated in FIG. 8.

Figure 12:
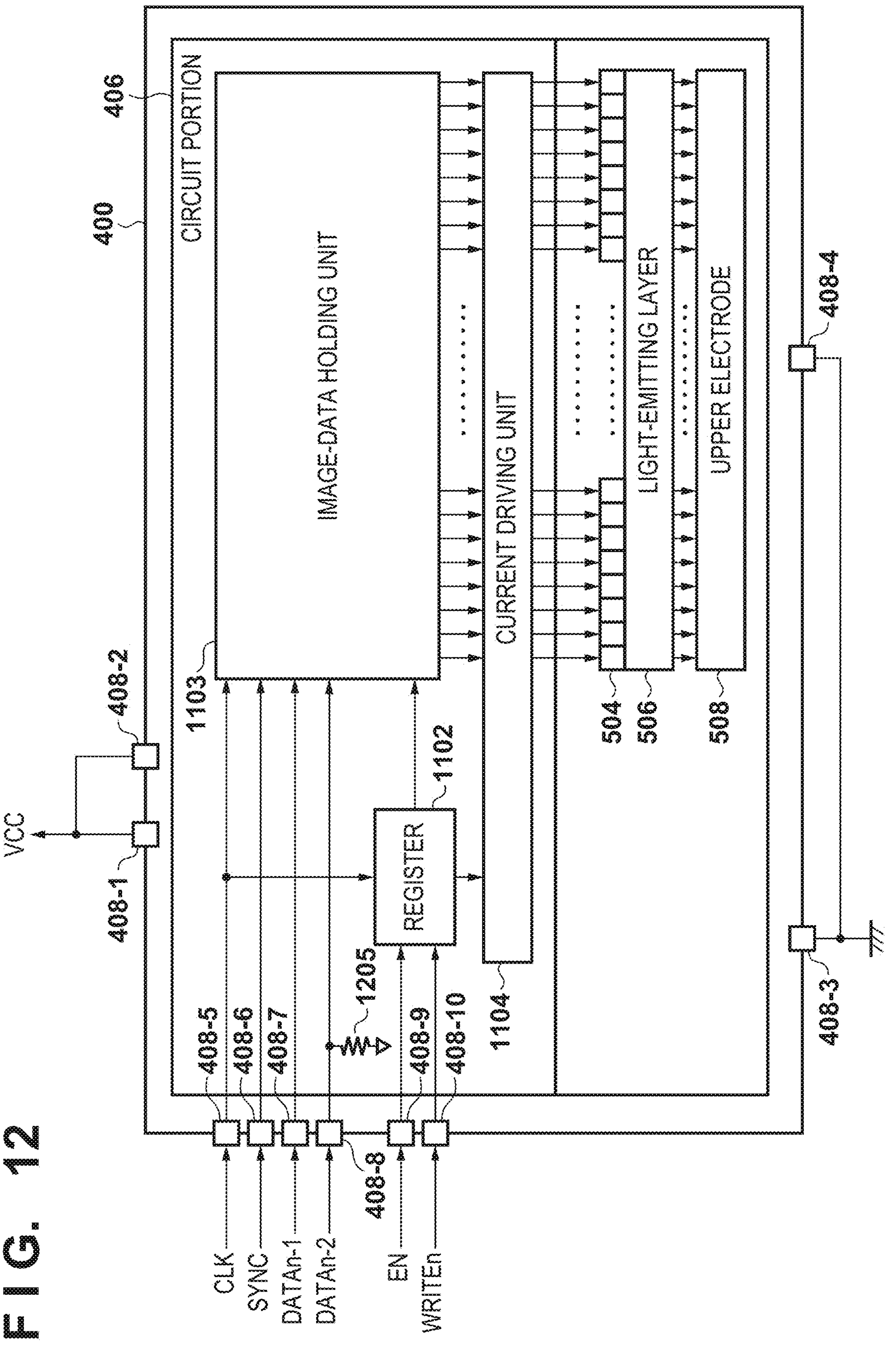
FIG. 12 is a functional block diagram of the light-emitting chips according to some embodiments.

FIG. 12 is a functional block diagram of one light-emitting chip 400-*n* mounted on the printed circuit boards 202-1 and 202-2. As also illustrated in FIG. 5, the light-emitting chip 400 includes the ten electrical pads 408-1 to 408-10. The electrical pads 408-1 and 408-2 are connected to a power-source voltage VCC via power lines. Power based on this power-source voltage VCC is supplied to each circuit in the circuit portion 406 of the light-emitting chip 400. The electrical pads 408-3 and 408-4 are connected to the ground via ground lines. The upper electrode 508 and each circuit in the circuit portion 406 are connected to the ground via the electrical pads 408-3 and 408-4. The signal lines CLK, SYNC, DATAn-1, and DATAn-2 are connected to an image-data holding unit 1103 via the electrical pads 408-5 to 408-8. Note that the image-data holding unit 1103 and the electrical pads 408-5 to 408-8 are connected via signal lines corresponding to the signal lines CLK, SYNC, DATAn-1, and DATAn-2, respectively. The signal lines EN and WRITEn are connected to a register 1102 via the electrical pads 408-9 and 408-10. Note that the signal line CLK is also input to the register 1102. Note that the register 1102 and the electrical pads 408-9 and 408-10 are connected via signal lines corresponding to the signal lines EN and WRITEn, respectively.

Note that a pull-down resistor 1205 is provided on the signal line inside the circuit portion 406 that connects the image-data holding unit 1103 and the electrical pad 408-8. The pull-down resistor 1205 is provided in order to fix the potential of the signal line inside the circuit portion 406 that is connected to the electrical pad 408-8 to a predetermined value, e.g., the ground potential, even if the signal line DATAn-2 connecting the data switching unit 705 and the electrical pad 408-8 of the light-emitting chip 400-*n* is not provided in the case of the printed circuit board 202-1. Note that, in the present embodiment, the printed circuit board 202-1 is provided with electrical pads for signal lines DATAn-2, but is not provided with signal lines DATAn-2 connecting the electrical pads and the electrical pads 408-8. Due to this, cost corresponding to the signal lines DATAn-2 can be reduced. Note that, for example, a configuration may be adopted in which the printed circuit board 202-1 is not provided with electrical pads for the signal lines DATAn-2. Due to this, cost corresponding to the electrical pads and the signal lines DATAn-2 can be reduced.

Figure 13:
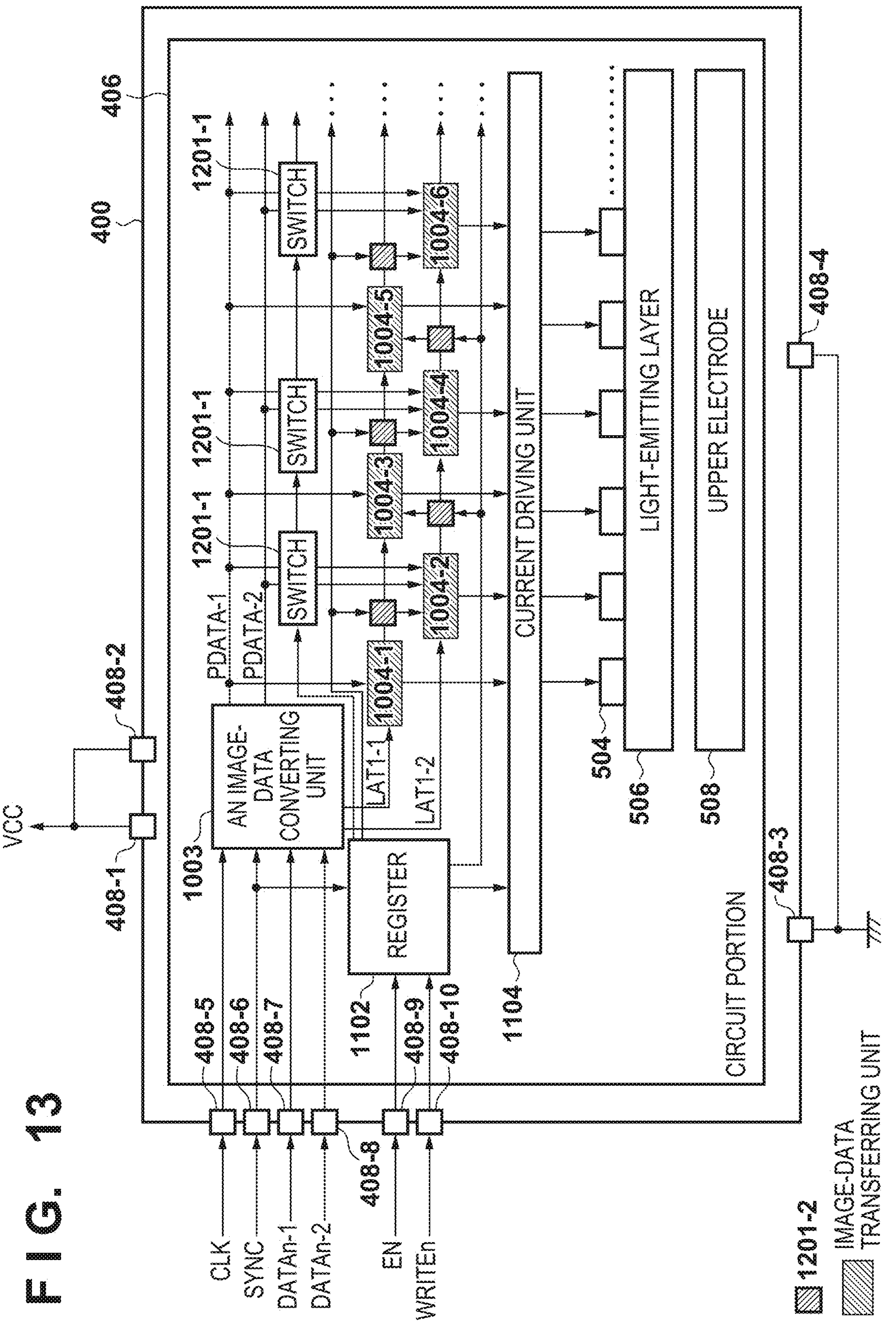
FIG. 13 is a functional block diagram of an image-data holding unit according to some embodiments.

FIG. 13 illustrates a functional block diagram of the image-data holding unit 1103. The image-data holding unit 1103 includes an image-data converting unit 1003 that receives image data transmitted via the signal lines DATAn-1 and DATAn-2. With the line synchronization signal from the signal line SYNC as the starting point, the image-data converting unit 1003 receives image data each indicating whether or not light is to be emitted by a light-emitting point 602 in the order of D1, D2, D3, D4, . . . in synchronization with the clock signal. Here, the image-data converting unit 1003 receives image data received via DATAn-1 in the order of D1-1, D2-1, D3-1, D4-1, . . . , and receives image data received via DATAn-2 in the order of D1-2, D2-2, D3-2, D4-2, . . . .

Furthermore, the image-data holding unit 1103 includes image-data transferring units 1004 that hold image data transmitted by the image-data converting unit 1003. While described in detail later, an image-data transferring unit 1004 is provided for each of the lower electrodes 504 of the light-emitting points 602 arranged in the main scanning direction. That is, in a case in which 748 light-emitting points 602 are arranged in the main scanning direction as in the present example, the image-data transferring units 1004 include image-data transferring units 1004-1 to 1004-748 (e.g., a first image-data transferring unit 1004-4, a second image-data transferring unit 1004-3, a third image-data transferring unit 1004-2, and a fourth image-data transferring unit 1004-1). In FIG. 13, only the image-data transferring units 1004-1 to 1004-6 are shown among the 748 image-data transferring units corresponding to the 748 light-emitting points 602 arranged in the main scanning direction. Note that, while image-data transferring units 1004 corresponding to the number of light-emitting points 602 in the main scanning direction are provided in the present example, there is no limitation to this, and a configuration may be adopted in which one image-data transferring unit 1004 is provided per a plurality of light-emitting points 602.

The image-data converting unit 1003 outputs received image data to signal lines, including a first signal line PDATA1 and a second signal line PDATA2. Here, the image-data converting unit 1003 outputs image data received via DATAn-1 to PDATA1, and outputs image data received via DATAn-2 to PDATA2. PDATA1 is connected to the image-data transferring units 1004-1 to 1004-748, and transfers image data output by the image-data converting unit 1003 to the image-data transferring units 1004-1 to 1004-748. Furthermore, PDATA2 is connected to the even-numbered image-data transferring units 1004 illustrated as image-data transferring units 1004-2, 1004-4, 1004-6, . . . , 1004-748. As illustrated in FIG. 13, each of the even-numbered image-data transferring units 1004 includes a switch 1201-1 on signal lines between PDATA1 and PDATA2 and itself, and can choose whether to receive image data from PDATA1 or PDATA2. The switches 1201-1 are switched based on register data stored in the register 1102. If the image-data converting unit 1003 receives image data via only DATAn-1, the switches 1201-1 are controlled so that the even-numbered image-data transferring units 1004 receive image data from PDATA1. Furthermore, if the image-data converting unit 1003 receives image data via the two signal lines DATAn-1 and DATAn-2, the switches 1201-1 are controlled so that the even-numbered image-data transferring units 1004 receive image data from PDATA2. That is, the switches 1201-1 correspond to the second switch circuit.

Next, the operations of the image-data converting unit 1003 and the image-data transferring units 1004 will be described. The image-data converting unit 1003 outputs a latch signal LAT1-1 to the image-data transferring unit 1004-1 at the timing when the image-data converting unit 1003 outputs image data D1-1, and outputs a latch signal LAT1-2 to the image-data transferring unit 1004-2 at the timing when the image-data converting unit 1003 outputs image data D1-2. A switch 1201-2 is provided between an odd-numbered image-data transferring unit 1004 and an even-numbered image-data transferring unit 1004 that are adjacent to one another, such as the image-data transferring unit 1004-1 and the image-data transferring unit 1004-2. The switches 1201-2 control image data transferred to the image-data transferring units 1004 based on the register data stored in the register 1102. The image-data transferring unit 1004-1 outputs a latch signal LAT2-1 at the timing when the image-data converting unit 1003 outputs image data D2-1. That is, the switches 1201-2 correspond to the first switch circuit.

If the image-data converting unit 1003 receives image data via only DATAn-1, the switches 1201-2 are controlled so that the latch signal LAT2-1 output by the image-data transferring unit 1004-1 is received by the image-data transferring unit 1004-2. Having received the latch signal LAT2-1, the image-data transferring unit 1004-2 outputs a latch signal LAT3-1 at the timing when the image-data converting unit 1003 outputs image data D3-1, and latch signals are output in order up to the image-data transferring unit 1004-748 as a result of similar operations being performed following this point. That is, the latch signals correspond to the start signals.

If the image-data converting unit 1003 receives image data via the two lines DATAn-1 and DATAn-2, the switches 1201-2 are controlled so that the latch signal LAT2-1 output by the image-data transferring unit 1004-1 is received by the image-data transferring unit 1004-3. Furthermore, the switches 1201-2 are controlled so that a latch signal LAT2-2 output by the image-data transferring unit 1004-2 is received by the image-data transferring unit 1004-4. Having received the latch signal LAT2-1, the image-data transferring unit 1004-3 outputs a latch signal LAT3-1 at the timing when the image-data converting unit 1003 outputs image data D3-1, and latch signals are output in order as a result of similar operations being performed following this point.

Each of the image-data transferring units 1004 continues to latch received image data from when a latch signal is received to when the next latch signal is received. Furthermore, each of the image-data transferring units 1004 continues to output, to a current driving unit 1104, a drive signal based on latched image data from when a latch signal is received to when the next latch signal is received. That is, each of the image-data transferring units 1004 continues to output a drive signal based on image data from when a line synchronization signal is received to when the next latch signal is received.

Note that, while a configuration in which the connection between PDATA1/PDATA2 and the even-numbered image-data transferring units 1004 is switched by the switches 1201-2 is adopted in the present example, there is no limitation to this, and a different form may be adopted. That is, a configuration may be adopted in which the switches 1201-2 are not provided, and the image-data converting unit 1003 having received image data via the two signal lines DATAn-1 and DATAn-2 outputs the image data to either PDATA1 or PDATA2. Furthermore, a configuration may be adopted in which the image-data transferring units 1004 accept image data from both PDATA1 and PDATA2, and output a drive signal based on either the image data accepted from PDATA1 or the image data accepted from PDATA2.

Figure 14:
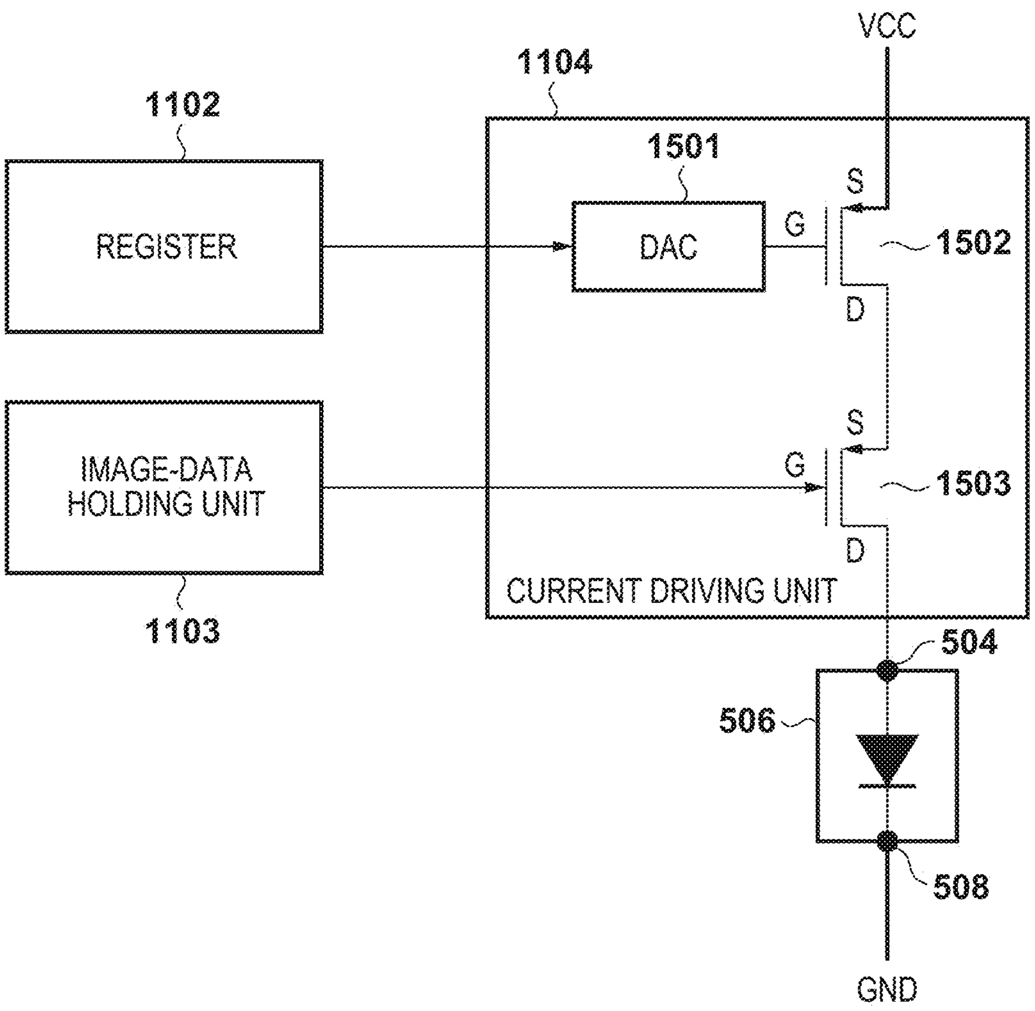
FIG. 14 is a configuration diagram of a current driving unit according to some embodiments.

FIG. 14 illustrates a configuration of the current driving unit 1104. Note that FIG. 14 only illustrates a circuit portion corresponding to one light-emitting point 602. The light-emitting chips 400 according to the present embodiment include a total of 2992 light-emitting points 602, and thus include 2992 of the circuit portions illustrated in FIG. 14. A DAC 1501 outputs an analog voltage corresponding to a digital value indicated by control data stored in the register 1102. An FET 1502 is a Pch-MOSFET, and the source terminal and drain terminal of the FET 1502 are respectively connected to the power-source voltage VCC and the source terminal of an FET 1503. The analog voltage output by the DAC 1501 is applied to the gate terminal of the FET 1502. Furthermore, the FET 1503 is also a Pch-MOSFET, and the drain terminal of the FET 1503 is connected to a lower electrode 504. A drive signal output from the image-data holding unit 1103 is input to the gate terminal of the FET 1503. The drive signal is a binary signal that is either high level or low level, and the FET 1503 is on while the drive signal is high level, whereas the FET 1503 is off while the drive signal is low level.

While the FET 1503 is on, the light-emitting point 602 emits light as a result of a current flowing from the power-source voltage VCC to the light-emitting layer 506 via the FET 1502 and the FET 1503. The light-emission intensity of the light-emitting point 602 changes in accordance with the current flowing through the light-emitting layer 506, and the value of the current is controlled by the analog voltage output by the DAC 1501. That is, the light-emitting intensity of each light-emitting point 602 is controlled by the control data stored in the register 1102. Note that the control data may individually indicate digital values for the DACs 1501 corresponding to the light-emitting points 602, or may indicate one digital value per each group of a plurality of light-emitting points 602.

Figure 15:
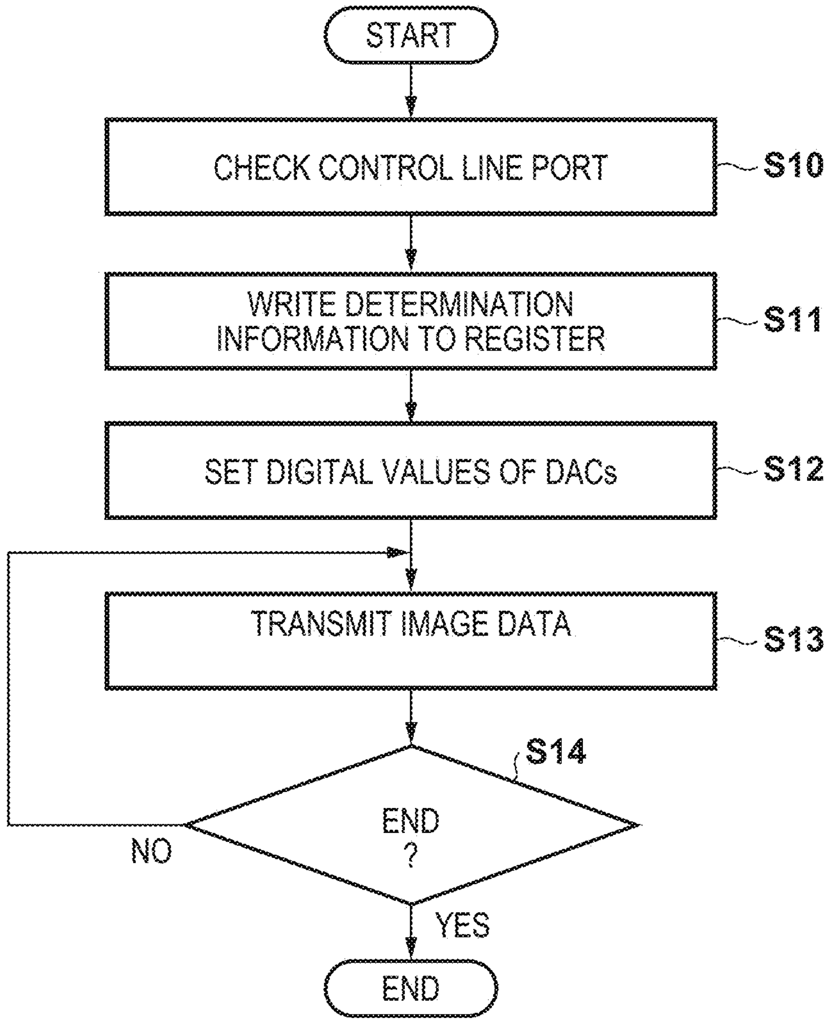
FIG. 15 is a flowchart of processing executed by an image controller according to some embodiments.

FIG. 15 is a flowchart of processing executed by the image controller 700 when a print request is made from a user. In step S10, the image controller 700 determines the type of printed circuit board 202, i.e., whether the printed circuit board 202 is the printed circuit board 202-1 or the printed circuit board 202-2, by determining the potential of the control line PORT. Note that, when the printed circuit board 202 is of a different type, the exposure head 106 is of a different type. In step S11, the image controller 700 writes determination information to the register 1102 of each light-emitting chip 400. The determination information is information for determining the signal line(s) used to transmit image data. As discussed above, in the present embodiment, one signal line DATAn-1 is used to transmit image data in the case of the printed circuit board 202-1, and the two signal lines DATAn-1 and DATAn-2 are used to transmit image data in the case of the printed circuit board 202-2. Subsequently, in step S12, the image controller 700 sets, to the register 1102, the digital values to be set to the DACs 1501 corresponding to the light-emitting points 602. Note that step S11 and step S12 may be performed in the reverse order. Subsequently, when the timing to start image forming arrives, the image controller 700 transmits image data in step S13 and starts to expose the photosensitive member 102. In step S14, the image controller 700 determines whether image forming is complete, and repeats processing from step S13 if image forming is not complete. On the other hand, if image forming is complete, the image controller 700 terminates the processing in FIG. 15.

As described above, the image controller 700 determines the type of printed circuit board 202, or in other words determines the type of exposure head 106, and determines one or more signal lines to be used to transmit image data to the exposure head 106 based on the type. Furthermore, the image controller 700 stores, in the register 1102 of each light-emitting chip 400, determination information for allowing the light-emitting chip 400 to determine the one or more signal lines used to transmit image data. The image-data holding unit 1103 of each light-emitting chip 400 determines the one or more signal lines to be used to receive image data based on the determination information stored in the register 1102 of the same light-emitting chip 400. According to this configuration, the amount of image data that each light-emitting chip 400 can receive per unit time can be changed. Accordingly, while using the same light-emitting chips 400 for exposure heads 106 of multiple types having different image-forming speeds, an increase in image-forming apparatus cost can be suppressed.

Note that, in the present embodiment, one resistor (pull-down resistor 706, pull-up resistor 707) is used to determine the type of printed circuit board 202 because the number of types of printed circuit boards 202, or in other words, the number of types of exposure heads 106 is two. However, the number of types of exposure heads 106 may be set to any number that is three or more. For example, if there are three or four types of exposure heads 106, the type of exposure head 106 can be determined by providing the printed circuit board 202 with two resistors. Alternatively, a configuration may be adopted in which, in order to determine the type of exposure head 106, a non-volatile memory device storing information indicating the type of exposure head 106 is provided instead of using a circuit including a resistor. In this case, the image controller 700 determines the type of exposure head 106 based on the information stored in the non-volatile memory device in the printed circuit board 202.

Furthermore, in the present embodiment, the number of signal lines is set to one or two depending on the type of exposure head 106. However, the number of signal lines to be used to transmit image data is not limited to one or two. For example, a configuration may be adopted in which the number of signal lines to be used to transmit image data is set to a first number for an exposure head 106 of the first type, and the number of signal lines to be used to transmit image data is set to a second number that is different from the first number for an exposure head 106 of the second type. Here, each of the first and second numbers is any number that is 1 or greater. This similarly applies to the case in which there are three or more types of exposure heads 106.

Second Embodiment

Next, a second embodiment will be described while focusing on the differences from the first embodiment. In the first embodiment, after determining the type of exposure head 106, the image controller 700 writes, to the register 1102 of each light-emitting chip 400, determination information for allowing the image-data holding unit 1103 to determine the one or more signal lines used to transmit image data (step S11 in FIG. 15). In the present embodiment, before transmitting image data, the image controller 700 notifies each light-emitting chip 400 of the one or more signal lines to be used to transmit image data by transmitting identification bits indicating determination information for determining the one or more signal lines used to transmit image data.

Figure 16:
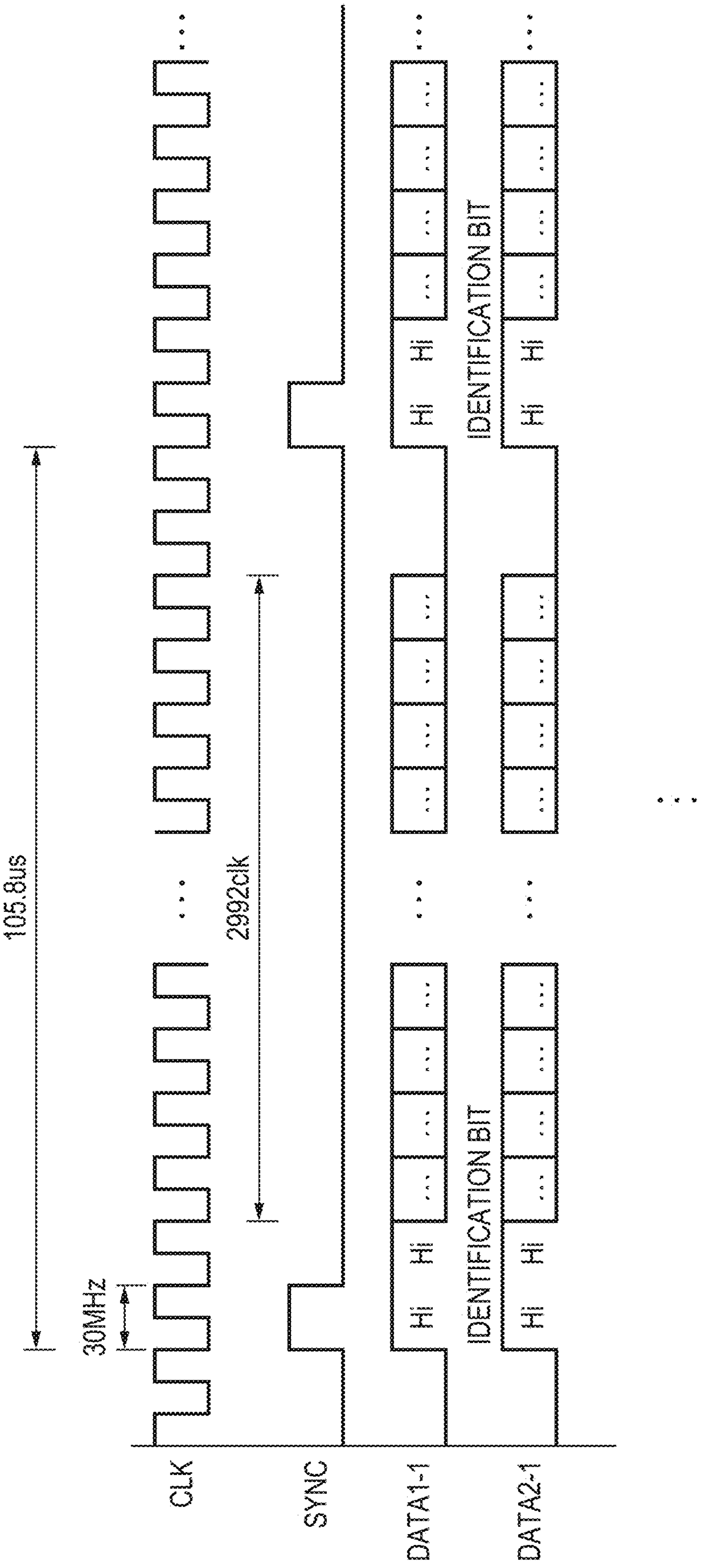
FIG. 16 is a diagram illustrating examples of signals of signal lines for transmitting image data to the light-emitting chips on the first printed circuit board according to some embodiments.

FIG. 16 illustrates signals of signal lines in a case in which image data is transmitted to the printed circuit board 202-1. The data switching unit 705 first transmits identification bits to the signal line DATAn-1 in synchronization with the rise of the line synchronization signal. In the present embodiment, the identification bits consist of two bits, and a state in which both the identification bits are high level indicates that the signal line DATAn-1 is the signal line used to transmit image data. After transmitting the identification bits, the data switching unit 705 transmits image data corresponding to the total of 2992 light-emitting points 602 using each of the signal line DATAn-1.

Figure 17:
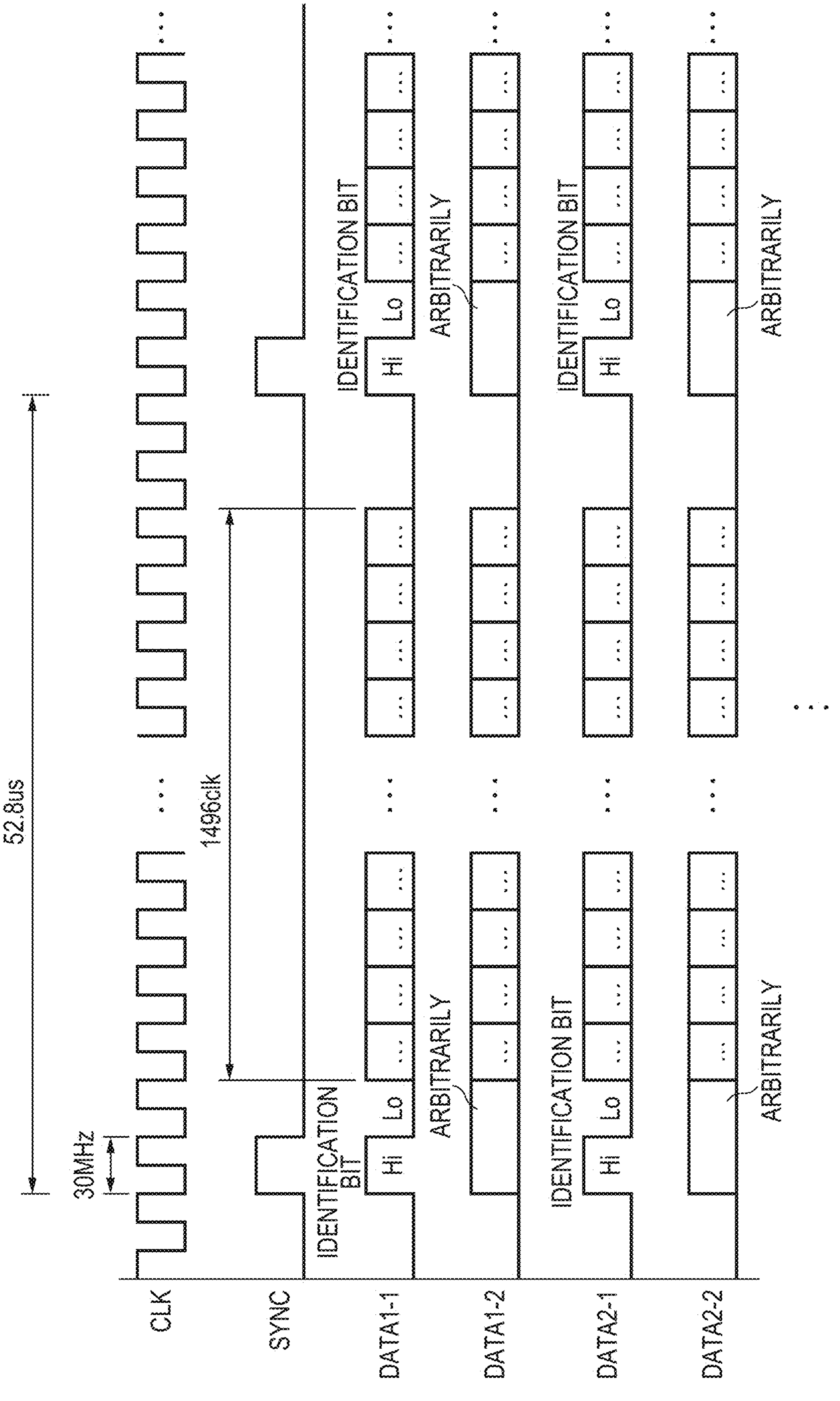
FIG. 17 is a diagram illustrating examples of signals of signal lines for transmitting image data to the light-emitting chips on the second printed circuit board according to some embodiments.

FIG. 17 illustrates signals of signal lines in a case in which image data is transmitted to the printed circuit board 202-2. The data switching unit 705 first transmits identification bits to the signal line DATAn-1 in synchronization with the rise of the line synchronization signal. The data values to be transmitted to the signal line DATAn-2 while the identification bits are being transmitted can be defined arbitrarily. In the present embodiment, a state in which the first of the identification bits is high level and the second is low level indicates that the signal lines DATAn-1 and DATAn-2 are the signal lines used to transmit image data. After transmitting the identification bits, the data switching unit 705 transmits image data corresponding to the total of 2992 light-emitting points 602 using the signal lines DATAn-1 and DATAn-2. In such a manner, the signal line via which the identification bits are transmitted is set in advance. Furthermore, a configuration can be adopted such that the signal line DATAn-1, which is used to transmit the identification bits, is always used to transmit image data. This may similarly apply also to cases in which three or more signal lines are used to transmit image data.

Figure 18:
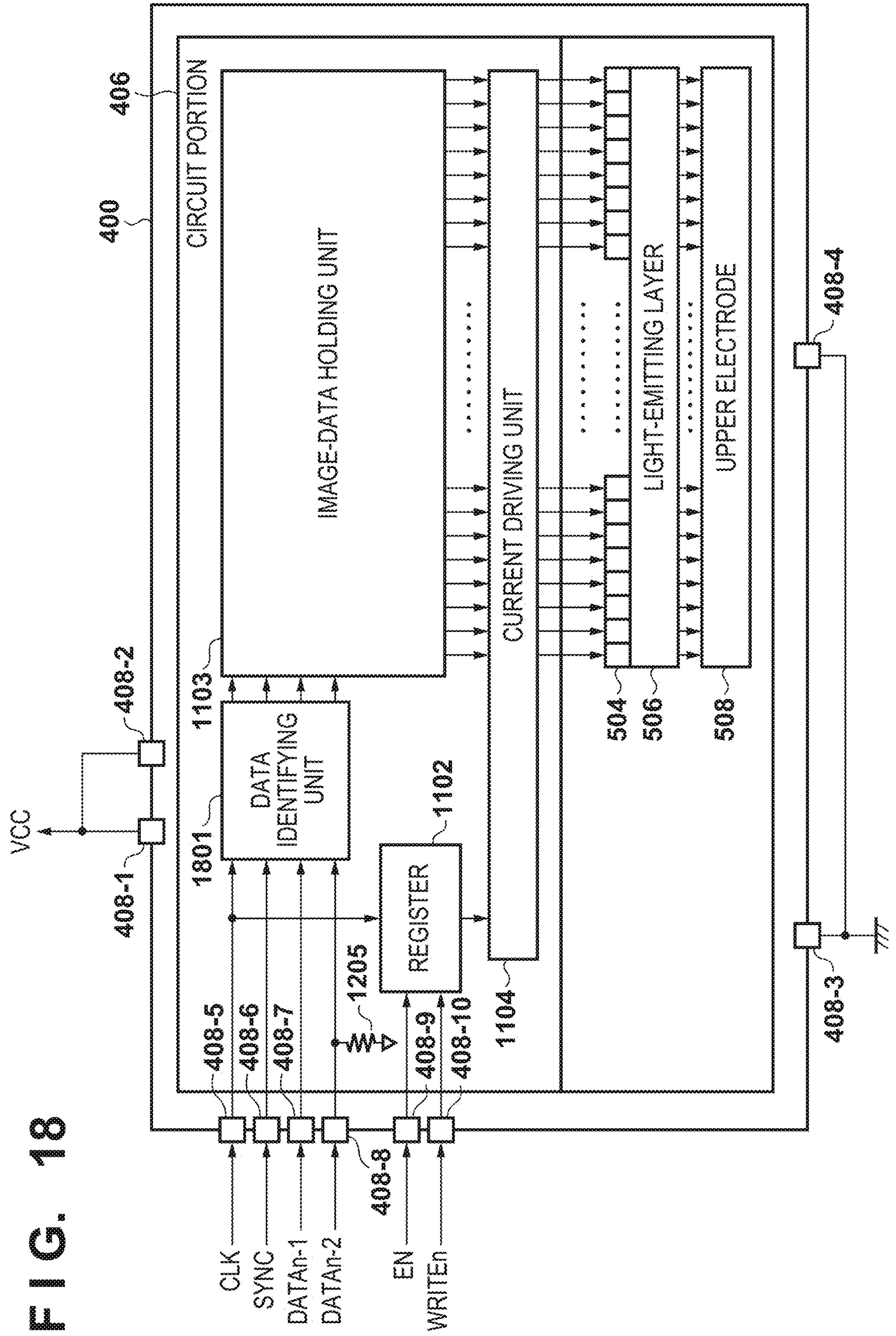
FIG. 18 is a functional block diagram of the light-emitting chips according to some embodiments.

FIG. 18 is a functional block diagram of one light-emitting chip 400-*n* mounted on the printed circuit boards 202-1 and 202-2 according to the present embodiment. In the following, description will be provided while focusing on the differences from the first embodiment, which is illustrated in FIG. 12. In the present embodiment, the signal lines CLK, SYNC, DATAn-1, and DATAn-2 are connected to a data identifying unit 1801. The data identifying unit 1801 and the image-data holding unit 1103 are connected via signal lines corresponding to the signal lines CLK, SYNC, DATAn-1, and DATAn-2. The data identifying unit 1801 outputs, to the image-data holding unit 1103, the clock signal and the line synchronization signal respectively received via the signal lines CLK and SYNC. Furthermore, the data identifying unit 1801 determines the one or more signal lines used to transmit image data based on the identification bits received in synchronization with the line synchronization signal. If the signal line DATAn-1 is the only signal line used to transmit image data, the data identifying unit 1801 outputs image data received via the signal line DATAn-1 to the image-data holding unit 1103. On the other hand, if the signal lines DATAn-1 and DATAn-2 are the signal lines used to transmit image data, the data identifying unit 1801 outputs image data received via the signal lines DATAn-1 and DATAn-2 to the image-data holding unit 1103. In such a manner, the data identifying unit 1801 and the image-data holding unit 1103 correspond to a receiving unit that receives image data.

Figure 19:
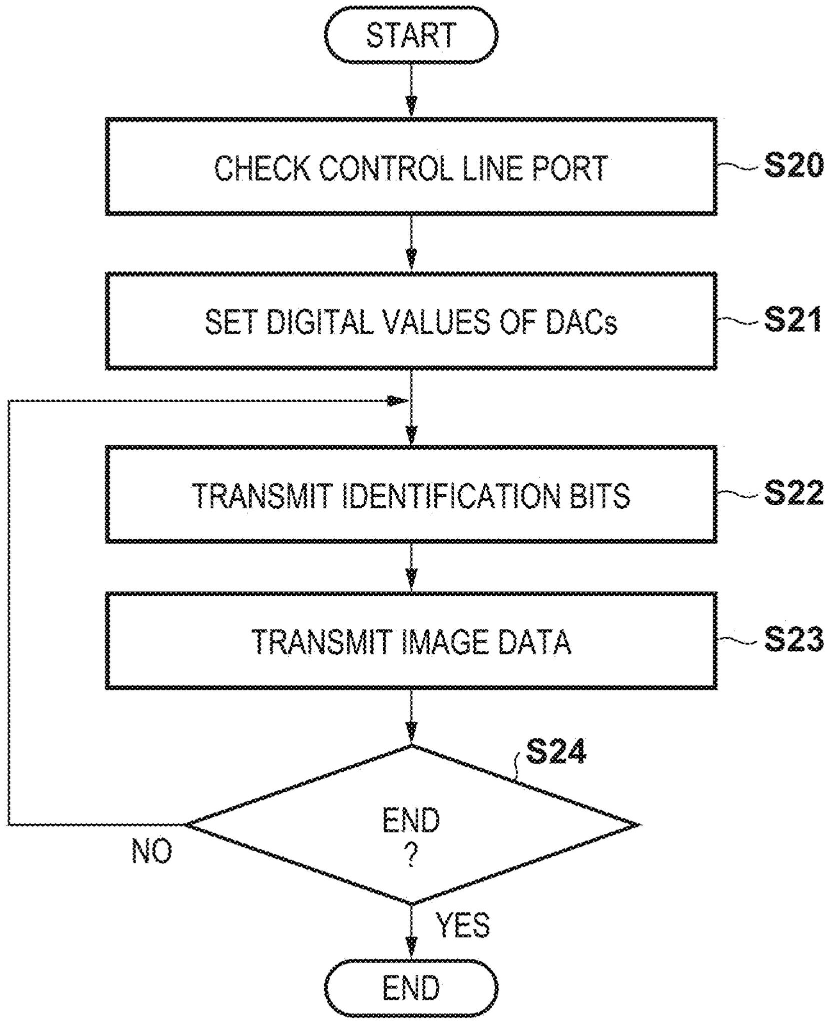
FIG. 19 is a flowchart of processing executed by the image controller according to some embodiments.

FIG. 19 is a flowchart of processing executed by the image controller 700 when a print request is made from a user. In step S20, the image controller 700 determines the type of printed circuit board 202, i.e., whether the printed circuit board 202 is the printed circuit board 202-1 or the printed circuit board 202-2, by determining the potential of the control line PORT. Note that, when the printed circuit board 202 is of a different type, the exposure head 106 is of a different type. In step S21, the image controller 700 sets, to the register 1102, the digital values to be set to the DACs 1501 corresponding to the light-emitting points 602. Subsequently, when the timing to start image forming arrives, the image controller 700 transmits identification bits to the signal line DATAn-1 in step S22, and then transmits image data corresponding to one line in step S23. Note that the one or more signal lines via which image data is to be transmitted are determined in accordance with the type of exposure head 106 determined in step S20. In step S24, the image controller 700 determines whether image forming is complete, and repeats processing from step S22 if image forming is not complete. On the other hand, if image forming is complete, the image controller 700 terminates the processing in FIG. 19.

According to the present embodiment as well, the amount of image data that each light-emitting chip 400 can receive per unit time can be changed. Accordingly, the same light-emitting chips 400 can be used for exposure heads 106 of multiple types having different image-forming speeds. Furthermore, according to the present embodiment, the time it takes for image forming can be reduced because there is no need to write determination information to the register 1102 of each light-emitting chip 400 when image forming is started.

In the above-described embodiments, the light-emitting chips 400 determine one or more signal lines to be used to receive image data based on determination information, and acquires the determination information from the image-forming apparatus. Specifically, in the first embodiment, the light-emitting chips 400 acquire the determination information as a result of the image controller 700 of the image-forming apparatus writing the determination information to the register 1102 of the light-emitting chips 400. Furthermore, in the second embodiment, the light-emitting chips 400 receive, or in other words, acquire the determination information via a signal line before receiving image data. Note that, in the first and second embodiments, the image controller 700 of the image-forming apparatus generates the determination information by determining the one or more signal lines to be used to transmit image data based on a circuit provided to the printed circuit board 202, i.e., a pull-up or pull-down resistor, or information stored in a non-volatile memory device. However, a configuration may be adopted in which, instead of acquiring the determination information from the image-forming apparatus, the light-emitting chips 400 determine the one or more signal lines to be used to receive image data based on a circuit such as a pull-up or pull-down resistor provided to the printed circuit board 202, or information stored in a non-volatile memory device. In this case, while the image controller 700 determines the one or more signal lines to be used to transmit image data based on a circuit provided to the printed circuit board 202 or information stored in a non-volatile memory device, the image controller 700 need not notify the light-emitting chips 400 of the determination information.

While specific numerical values have been used in the above-described embodiments for the sake of explanation, these specific numerical values are examples, and the present invention is not limited to the specific numerical values used in the embodiments. Specifically, the number of light-emitting chips 400 provided on one printed circuit board 202 is not limited to 20, and may be set to any number that is one or more. Furthermore, the number of light-emitting points 602 included in each light-emitting chip 400 is not limited to 2992 either, and may be another number. Furthermore, while one light-emitting chip 400 includes four sets of 748 light-emitting points arranged along the main scanning direction in the present embodiment, the number of sets may be set to any number that is 1 or greater. Furthermore, while light-emitting points 602 are arranged in the main scanning direction at a pitch of approximately 21.16 μm, which corresponds to a resolution of 1200 dpi, another value may also be set to the interval at which the light-emitting points 602 are arranged.

Furthermore, in the above-described embodiments, the image-forming apparatus transfers toner images formed on the respective photosensitive members 102 to a sheet conveyed on the transfer belt 111. However, the image-forming apparatus may transfer toner images on the respective photosensitive members 102 to a sheet via an intermediate transfer member. Furthermore, the image-forming apparatus may be a color image-forming apparatus that forms an image using toners of a plurality of colors, or a monochrome image-forming apparatus that forms an image using toner of a single color.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-117429, filed Jul. 22, 2022, which is hereby incorporated by reference herein in its entirety.

What is claimed is:

1. A light-emitting chip mounted on a long circuit board, the light-emitting chip comprising:
- a plurality of light-emitting portions arranged along a longitudinal direction of the circuit board, the plurality of light-emitting portions emitting light for exposing a photosensitive member;
- a first electrical pad configured to receive image data for controlling the plurality of light-emitting portions on and off;
- a second electrical pad configured to receive the image data; and
- a register configured to store control data,
- wherein the light-emitting chip operates, in accordance with the control data, in either a first mode in which the image data is received at either one of the first electrical pad or the second electrical pad, or a second mode in which the image data is received at both the first electrical pad and the second electrical pad.

2. The light-emitting chip according to claim 1, wherein:
- the light-emitting chip receives the image data from a controller;
- the controller and the first electrical pad are connected via a first signal line; and
- the controller and the second electrical pad are connected via a second signal line that is not shared with the first signal line.

3. The light-emitting chip according to claim 1, wherein the register further stores data indicating a light emission intensity of the plurality of light-emitting portions.

4. The light-emitting chip according to claim 1, further comprising an image data transfer unit configured to output a drive signal based on the image data to each of the plurality of light-emitting portions.

5. The light-emitting chip according to claim 1, wherein the plurality of light-emitting portions are organic EL elements.

6. The light-emitting chip according to claim 1, wherein the plurality of light-emitting portions include:

a first electrode layer including a plurality of electrodes;

a second electrode layer configured to allow light to pass through; and a light-emitting layer provided between the first electrode layer and the second electrode layer.

* * * * *